(12) United States Patent
Onal et al.

(10) Patent No.: US 12,105,200 B2
(45) Date of Patent: Oct. 1, 2024

(54) DETECTING RETROREFLECTORS IN NIR IMAGES TO CONTROL LIDAR SCAN

(71) Applicant: Waymo LLC, Mountain View, CA (US)

(72) Inventors: Caner Onal, Palo Alto, CA (US); Nirav Dharia, Milpitas, CA (US); Giulia Guidi, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 933 days.

(21) Appl. No.: 17/085,259

(22) Filed: Oct. 30, 2020

(65) Prior Publication Data

US 2022/0137218 A1 May 5, 2022

(51) Int. Cl.
*G01S 17/89* (2020.01)
*G01N 21/359* (2014.01)
(Continued)

(52) U.S. Cl.
CPC ............ *G01S 17/89* (2013.01); *G01N 21/359* (2013.01); *G01S 7/484* (2013.01); *G01S 7/4861* (2013.01)

(58) Field of Classification Search
CPC ...... G01S 7/4868; G01S 7/489; G01S 7/4918; G01S 7/4802; G01S 7/4804; G01S 7/4815; G01S 17/04; G01S 17/86; G01S 17/931; G06V 10/82; B60W 2420/42; B60W 2420/52
See application file for complete search history.

(56) References Cited

U.S. PATENT DOCUMENTS 8,675,181 B2   3/2014   Hall
8,842,015 B2   9/2014   Scott
(Continued)

FOREIGN PATENT DOCUMENTS

EP   2228782   9/2010

OTHER PUBLICATIONS

International Searching Authority, International Search Report and Written Opinion mailed on Jan. 11, 2022, issued in connection with International Patent Application No. PCT/US2021/071552, filed on Sep. 22, 2021, 9 pages.
(Continued)

*Primary Examiner* — Luke D Ratcliffe
(74) *Attorney, Agent, or Firm* — McDonnell Boehnen Hulbert & Berghoff LLP

(57) ABSTRACT

A system includes a near-infrared (NIR) illuminator, an NIR image sensor, a light detection and ranging (LIDAR) device, and control circuitry configured to perform operations. The operations include causing the NIR illuminator to illuminate a portion of an environment, and obtaining, from the NIR image sensor, NIR image data representing the portion of the environment illuminated by the NIR illuminator. The operations also include detecting a retroreflector within the NIR image data and, based on detecting the retroreflector within the NIR image, determining a position of the retroreflector within the environment. The operations further include, based on the position of the retroreflector within the environment, adjusting at least one parameter of the LIDAR device in connection with scanning the retroreflector.

20 Claims, 13 Drawing Sheets

(51) Int. Cl.
*G01S 7/484* (2006.01)
*G01S 7/4861* (2020.01)

(56) References Cited

U.S. PATENT DOCUMENTS

| | | | |
|---|---|---|---|
| 8,996,228 B1 | 3/2015 | Ferguson et al. | |
| 9,921,297 B2 | 3/2018 | Jungwirth | |
| 2006/0279745 A1 | 12/2006 | Wenstrand et al. | |
| 2007/0131844 A1* | 6/2007 | Shoji | G01S 7/4868 |
| | | | 250/205 |
| 2015/0346325 A1* | 12/2015 | Giacotto | G01C 3/08 |
| | | | 356/5.01 |
| 2016/0003946 A1* | 1/2016 | Gilliland | G01S 17/894 |
| | | | 356/5.01 |
| 2016/0162747 A1 | 6/2016 | Singh et al. | |
| 2016/0321825 A1* | 11/2016 | Karasawa | G06T 7/194 |
| 2017/0273161 A1 | 9/2017 | Nakamura | |
| 2018/0239005 A1* | 8/2018 | Dussan | G01S 7/006 |
| 2018/0299534 A1* | 10/2018 | LaChapelle | G06F 18/25 |
| 2019/0179029 A1 | 6/2019 | Pacala et al. | |
| 2019/0196020 A1* | 6/2019 | Aceti | G01S 7/4815 |
| 2019/0392605 A1* | 12/2019 | Holliday | G06V 20/52 |
| 2020/0141716 A1 | 5/2020 | Droz et al. | |
| 2020/0226363 A1 | 7/2020 | Holliday et al. | |

OTHER PUBLICATIONS

Cho et al., "A Mulit-Sensor Fusion System for Moving Object Detection and Tracking in Urban Driving Environments," 2014 IEEE International Conference on Robotics & Automatin (ICRA), Hong Kong Convention and Exhibition Center, May 31-Jun. 7, 2014, pp. 1836-1843.

De Silva et al., "Robust Fusion of LiDAR and Wide-Angle Camera Data for Autonomous Mobile Robots," Institute for Digital Technologies, Loughborough University, London UK, 2018, 21 pages.

Soloviev, Valentin, "Specifics of Using LIDAR and IR-Camera for Detecting Obstacles on Maritime Vessels," Novia University of Applied Sciences, 2014-2020, 23 pages.

Sweet, Timothy L., "Alignment of LiDAR and Long-Wave Infrared Sensors to a GPS/INS by Non-Experts," Thesis, University of Nevada, Reno, Dec. 2018, 68 pages.

Wang et al., "Multi-Sensor Fusion in Automated Driving: A Survey," Digital Object Identifier, IEEE Access, 2020, pp. 2847-2868, vol. 8.

Wei et al., "LiDAR and Camera Detection Fusion in a Real-Time Industrial Multi-Sensor Collision Avoidance System," Electronics, 2018, 32 pages, vol. 7, No. 84.

Wood, et al., "LiDAR Scanning with Supplementary UAV Captured Images for Structural Inspections," Civil Engineering Faculty Publications, 2015, 11 pages.

* cited by examiner

DETECTING RETROREFLECTORS IN NIR IMAGES TO CONTROL LIDAR SCAN

BACKGROUND

Light detection and ranging (LIDAR) devices may estimate distances to objects in a given environment. For example, an emitter subsystem of a LIDAR device may emit near-infrared light pulses, which may interact with objects in the device's environment. At least a portion of the light pulses may be redirected back toward the LIDAR (e.g., due to reflection or scattering) and detected by a detector subsystem. Conventional detector subsystems may include a plurality of detectors and a corresponding controller configured to determine an arrival time of the respective light pulses with high temporal resolution. The distance between the LIDAR device and a given object may be determined based on a time of flight of the corresponding light pulses that interact with the given object.

SUMMARY

The presence of retroreflectors within an environment may make it difficult for a LIDAR device to accurately perceive portions of the environment. Relative to many other surfaces within the environment, the retroreflectors may reflect a much larger proportion of the light emitted by the LIDAR device back toward the LIDAR device. In order to allow the LIDAR device to adjust its imaging parameters to account for the presence of the retroreflectors, a near-infrared (NIR) illuminator and an MR image sensor may be used to detect the retroreflectors. The NIR illuminator may be used to project a pulse of NIR light at the environment, and the NIR image sensor may be used to capture an NIR image of the environment illuminated by the NIR light. Retroreflectors may appear within the NIR image as regions of relatively high-intensity pixels. The positions of the retroreflectors within the NIR image may be used to determine positions of the retroreflectors relative to the LIDAR device, thus allowing the parameters of the LIDAR device to be spatially modulated according to positions of the retroreflectors.

In a first example embodiment, a system may include an NIR illuminator, an NIR image sensor, a LIDAR device, and control circuitry configured to perform operations. The operations may include causing the NIR illuminator to illuminate a portion of an environment. The operations may also include obtaining, from the NIR image sensor, NIR image data representing the portion of the environment illuminated by the NIR illuminator. The operations may additionally include detecting a retroreflector within the NIR image data. The operations may further include, based on detecting the retroreflector within the NIR image, determining a position of the retroreflector within the environment. The operations may yet further include, based on the position of the retroreflector within the environment, adjusting at least one parameter of the LIDAR device in connection with scanning the retroreflector.

In a second example embodiment, a method is provided that may include illuminating a portion of an environment by way of an NIR illuminator. The method may also include generating, by a NIR image sensor, NIR image data representing the portion of the environment illuminated by the NIR illuminator. The method may additionally include detecting a retroreflector within the NIR image data. The method may further include, based on detecting the retroreflector within the NIR image, determining a position of the retroreflector within the environment. The method may yet further include, based on the position of the retroreflector within the environment, adjusting at least one parameter of a LIDAR device in connection with scanning the retroreflector.

In a third example embodiment, a non-transitory computer-readable storage medium is provided having stored thereon instructions that, when executed by a computing system, cause the computing system to perform operations. The operations include causing an NIR illuminator to illuminate a portion of an environment. The operations also include obtaining, from a NIR image sensor, NIR image data representing the portion of the environment illuminated by the NIR illuminator. The operations additionally include detecting a retroreflector within the NIR image data. The operations further include, based on detecting the retroreflector within the NIR image, determining a position of the retroreflector within the environment. The operations yet further include, based on the position of the retroreflector within the environment, adjusting at least one parameter of a LIDAR device in connection with scanning the retroreflector.

In a fourth example embodiment, a system is provided that may include means for illuminating a portion of an environment with NIR light. The system may also include means for generating NIR image data representing the portion of the environment illuminated by the NIR light. The system may additionally include means for detecting a retroreflector within the NIR image data. The system may further include means for, based on detecting the retroreflector within the NIR image, determining a position of the retroreflector within the environment. The system may yet further include means for, based on the position of the retroreflector within the environment, adjusting at least one parameter of a LIDAR device in connection with scanning the retroreflector.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
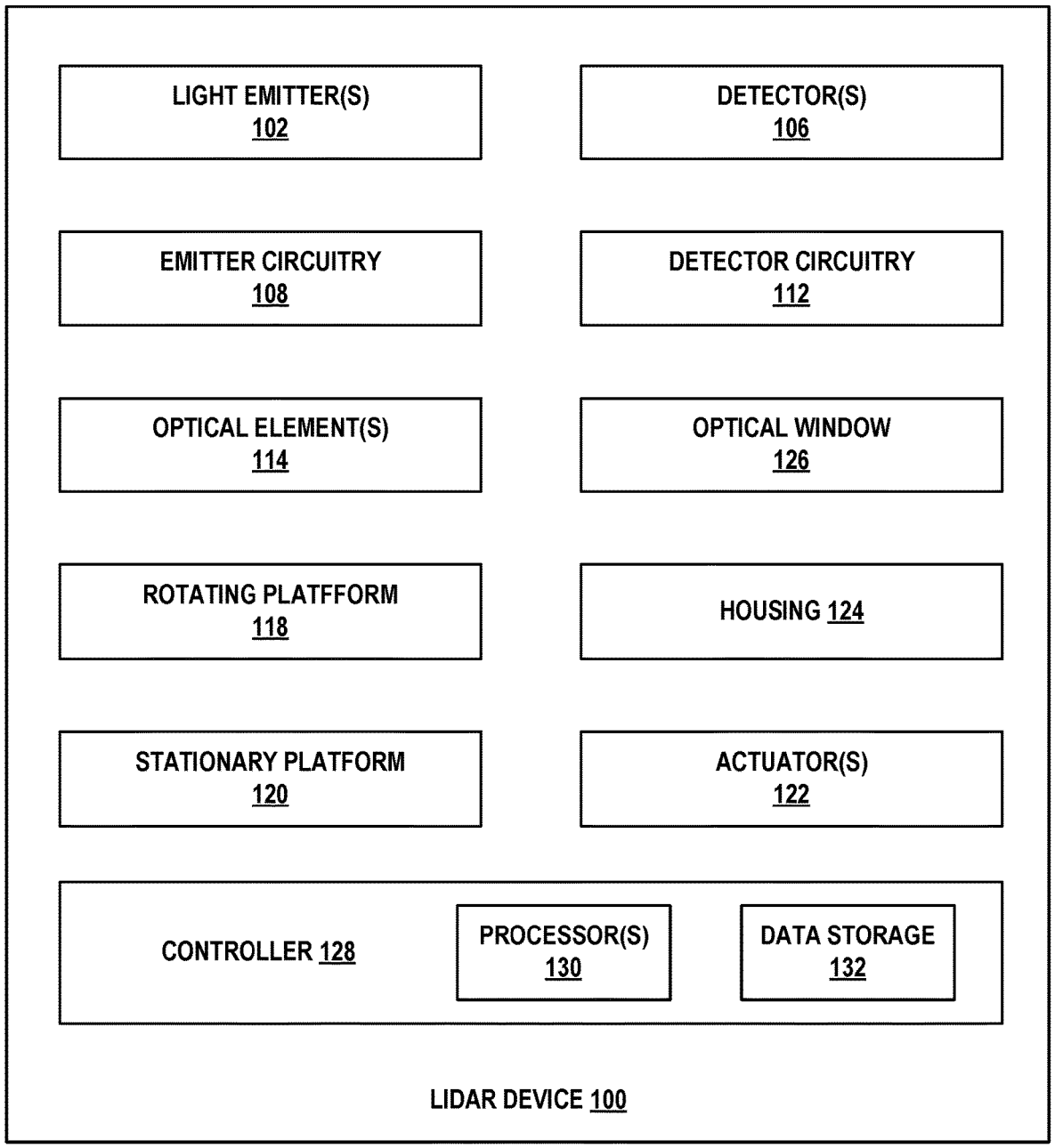
FIG. 1 illustrates a simplified block diagram of a LIDAR device, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

An autonomous vehicle or a robotic device may include a plurality of sensors that may be used to assist with perception of and navigation through various environments. These sensors may include (visible light) image sensors, light detection and ranging (LIDAR) devices, radio detection and ranging (RADAR) devices, near-infrared (NIR) image sensors, thermal cameras, and/or ultrasonic imaging devices, among other possibilities. Some of these sensors may be well-suited for operating under certain environmental conditions or detecting certain environmental features, and some might have difficulty operating under other environmental conditions and/or detecting other types of environmental features.

A LIDAR device may include one or more light emitters configured to emit light pulses into the environment and one or more detectors configured to detect returning light pulses that correspond to reflections of the emitted light pulses by one or more objects in the environment. A time difference between a time when a light pulse is emitted and a time when a reflection of the light pulse is detected may be used to determine a distance between the LIDAR device and an object that reflected the light pulse. In general, the intensity of a reflected light pulse that is detected by the detector is dependent upon various factors that include the intensity of the emitted light pulse, the distance to the object that reflects the light pulse, the angle of incidence relative to the surface of the object, the reflectivity of the surface of the object, and whether the surface of the object reflects light diffusely (e.g., in a Lambertian reflectance pattern) or specularly (like a mirror). Assuming that other factors are equal, more reflective objects typically result in higher intensity reflected light pulses than less reflective objects.

A LIDAR device may have difficulty with detecting retroreflectors and/or other highly reflective surfaces within the environment of the LIDAR device. Common examples of retroreflectors include road signs, lane markers, and front, side, and rear reflectors on cars, trucks, bicycles and other vehicles. In some instances, retroreflectors may be configured to reflect light back towards its source across a range of possible incidence angles of the light, and may do so with little to no scattering of the light. A retroreflector may include objects having a reflectivity greater than a threshold value. For example, objects having a reflectivity that is greater than 80%, greater than 90%, greater than 95%, or greater than 99%, depending on the application, may be considered retroreflectors. Further, if the term "reflectivity" is defined as effective Lambertian reflectivity, then a retroreflector may have a reflectivity that is greater than 100%. Additionally, any discussion herein of retroreflectors may also be equally applicable to other highly reflective surfaces, some of which may be configured to reflect light back toward its source across a smaller subset of the range of possible incidence angles of the light accommodated by a retroreflector (e.g., only when the light is incident normal to the highly reflective surface).

In some instances, the reflected light pulses from retroreflectors can be so intense as to cause various problems with the desired operation of a LIDAR device. For example, retroreflectors may cause problems such as range aliasing, cross-talk among different channels of the LIDAR, detector saturation, blooming, and other types of errors in a LIDAR device.

For example, the problem of range aliasing can arise when a light pulse emitted in a first measurement period is reflected by a retroreflector that is sufficiently distant that the reflected light pulse is detected in a second measurement period. When this occurs, it may be difficult to determine whether the reflected light pulse is a reflection of the light pulse emitted during the first measurement period or the light pulse emitted during the second measurement period. This, in turn, can create ambiguity as to how to determine the distance to the object that generated the reflected light pulse.

Another problem that can be caused by retroreflectors is cross-talk. As noted above, a LIDAR device may include multiple light emitters and multiple detectors that are arranged to provide multiple transmit/receive channels, with each channel having a respective field of view. In practice, however, a small amount of light from one channel may be scattered into another channel. In some cases, such scattering may be the result of incomplete isolation between the channels within the LIDAR device. Alternatively or additionally, scattering may occur at the surfaces of windows, lenses, or other optical components (e.g., due to scratches, streaks, water droplets, or other imperfections or debris) of the LIDAR device. It is also possible for scattering to occur outside of the LIDAR device. For example, fog, rain, and snow can scatter light.

Such scattering can affect light that is transmitted from the LIDAR device into the environment of the LIDAR device and can also affect light that is received by the LIDAR device from the environment. With regard to transmitted light, some of the light emitted in a first channel may be scattered into the field of view of a second channel (e.g., a neighboring channel). The stray light that results from this scattering may be reflected by an object in the field of the view of the second channel, which may result in reflected stray light from the object being detected by the detector in the second channel. With regard to received light, some of the light reflected by an object in the field of view of a first channel may be scattered into the field of view of a second channel. The stray light that results from this scattering may be detected by the detector in the second channel.

To address the possibility of light from one channel being scattered into another channel, a threshold may be used to determine whether to use a detected light pulse for distance determination. In this approach, if a detector detects a light pulse that exceeds the threshold (e.g., the height, integrated area, or other measure of the magnitude of the pulse exceeds the threshold), then the detected light pulse may be regarded as a reflection of the light pulse emitted by the detector's corresponding light emitter and, on that basis, may be used for distance determination. On the other hand, if a detector detects a light pulse that does not exceed the threshold, then the light pulse may be considered the result of scattered light or noise and, on that basis, not used for distance determination.

This threshold approach, however, may be insufficient when a retroreflector is within a particular channel's field of view. When the light emitter in the particular channel emits a light pulse toward a retroreflector, the intensity of the reflected light pulse from the retroreflector can be sufficiently high that scattering of the reflected light into one or more other channels may result in a detector in one of the other channels detecting a light pulse that exceeds the threshold. This, in turn, may result in a spurious distance determination. Further, even when the light emitter in the particular channel is turned off, a significant amount of stray light may reach the retroreflector due to scattering of light emitted in other channels. The retroreflector may reflect this stray light, resulting in the detector in the particular channel detecting a light pulse that exceeds the threshold.

To mitigate errors that can be caused by retroreflectors or other highly reflective objects, disclosed herein are methods and systems for detecting retroreflectors or other highly reflective objects in an environment and, in response, adjusting one or more parameters of the LIDAR device in connection with scanning the retroreflectors or other highly reflective objects. Specifically, a NIR illuminator may be used to illuminate a portion of the environment. While the NIR illuminator emits NIR light, a NIR image sensor may be used to capture NIR image data that represents the portion of the environment illuminated by the NIR light. The NIR image data may then be processed by one or more algorithms to detect therein one or more retroreflectors.

Processing of the NIR image data may be carried out by circuitry associated with the NIR image sensor (e.g., contained within a shared housing and/or package), circuitry associated with the autonomous vehicle, circuitry associated with the LIDAR device, and/or other circuitry provided for such processing. In one embodiment, the circuitry may be configured to identify one or more pixels within the NIR image data that have an intensity which exceeds a threshold intensity value. The threshold intensity value may be selected or calibrated so as to distinguish between reflection of NIR light from retroreflectors and (ii) reflection of NIR light from non-retroreflective surfaces. For example, the threshold intensity value may be selected empirically based on a plurality of calibration images that represent retroreflectors and/or non-retroreflective objects. The threshold intensity value may be adjusted depending on various factors such as time of day, weather conditions, and/or NIR illuminator power, among other possibilities.

In another embodiment, the NIR image sensor may be used to capture an additional NIR image of the portion of the environment without illumination by the NIR illuminator. The circuitry may be configured to subtract the additional NIR image data (without NIR illumination) from the initial NIR image data (with NIR illumination) to obtain a difference image. Since the computed difference between corresponding pixels representing retroreflectors is likely to be high and the difference between corresponding pixels representing non-retroreflective regions is likely to be low, the difference image may indicate retroreflectors as regions of high pixel intensity. Additionally, when the NIR image data represents sources of NIR light in the environment that are not retroreflectors (but are nevertheless shown as regions of high pixel intensity in the NIR image data), image subtraction may filter out these sources of NIR light such that they do not appear in the difference image, thereby avoiding false-positive detections of objects that are not actually retroreflectors.

In a further embodiment, retroreflectors may be detected within the NIR image data by way of one or more machine learning algorithms implemented by the circuitry. For example, a neural network may be trained to detect retroreflectors within the NIR image data based on training data that includes a plurality of NIR training images each labeled with zero or more retroreflector positions or regions.

A position of the retroreflector within the environment may be determined based on the detection of the retroreflector within the NIR image data. Specifically, based on identifying one or more pixels representing a retroreflector, the circuitry may be configured to determine the pixel coordinates of these pixels, thereby indicating the position of the retroreflector within the NIR image data. Additionally, based on the respective poses of the NIR image sensor and LIDAR device on the autonomous vehicle, pixel coordinates of the retroreflector within the NIR image data may be transformed to coordinates within a reference frame of the autonomous vehicle, which may in turn be transformed to coordinates within a reference frame of the LIDAR device. Thus, the position of the retroreflector may be expressed in the coordinate system used by the LIDAR device for scanning the environment, thereby allowing the LIDAR to adjust how it scans the retroreflector and regions around it.

In one implementation, the LIDAR device may be configured to omit scanning the retroreflector. Specifically, one or more light emitters and/or one or more detectors may be deactivated during one or more measurement periods when the retroreflector is expected to be within the respective fields of view of these emitters and/or detectors (or within a threshold distance thereof).

In another implementation, the LIDAR device may be configured to reduce an intensity of light emitted thereby in connection with scanning the retroreflector. Specifically, the transmit power of one or more light emitters may be reduced during one or more measurement periods when the retroreflector is expected to be within the respective fields of view of these emitters (or within a threshold distance thereof).

In a further implementation, the LIDAR device may be configured to reduce a sensitivity of one or more detectors of the LIDAR device in connection with scanning the retroreflector. Specifically, the sensitivity of one or more detectors may be reduced during one or more measurement periods when the retroreflector is expected to be within the respective fields of view of these detectors (or within a threshold distance thereof). The sensitivity of the detectors may be adjusted by adjusting a bias voltage associated with the detectors (e.g., to control a gain value thereof), adjusting an amount of time during which the detectors are active, and/or using other techniques, depending on the type of detector used.

Aspects of the NIR illuminator and NIR image sensor may be selected based on corresponding aspects of the LIDAR device. For example, the NIR illuminator may use an NIR frequency band that is adjacent to and mutually exclusive of frequency bands used by the LIDAR device. This may allow the NIR image data to be representative of the reflectivity that the LIDAR device is likely to experience while at the same time allowing the light generated by the NIR illuminator to not trigger the LIDAR detectors. Further, the NIR illuminator and the LIDAR device may be positioned on the vehicle so as to have a similar field of view and a similar optical path. Thus, retroreflectors detected within the NIR image data are those that are likely to be scanned by and problematic for the LIDAR device.

II. Example LIDAR Systems

FIG. 1 is a simplified block diagram of a LIDAR device 100, according to example embodiments. As shown, LIDAR device 100 includes one or more light emitters 102, one or more detectors 106, emitter circuitry 108, detector circuitry 112, one or more optical elements 114, an optical window 126, a housing 124, a rotating platform 118, a stationary platform 120, one or more actuators 122, and a controller 128. In some embodiments, LIDAR device 100 may include more, fewer, or different components. Additionally, the components shown may be combined or divided in any number of ways.

Light emitter(s) 102 are configured to emit light, for example, in the form of pulses. Each light pulse could have a duration that is suitable for determining distances to objects in the environment. For example, each light pulse could have a duration that is between 2 nanoseconds and 5 nanoseconds. Other pulse durations are possible as well. The light emitted by light emitter(s) 102 could have a narrow range of wavelengths. For example, light emitter(s) 102 could include laser diodes, laser diode bars, vertical cavity surface emitting lasers (VCSEL), fiber lasers, or other narrowband light sources. Alternatively, light emitter(s) 102 could emit light with a broader range of wavelengths. For example, light emitter(s) 102 could include light emitting diodes (LEDs). Other types of light sources are possible as well. The wavelengths emitted by light emitter(s) 102 could be, for example, in the ultraviolet, visible, and/or infrared portions of the electromagnetic spectrum. In an example embodiment, light emitter(s) 102 include laser diodes that emit light at a wavelength of about 905 nanometers.

In some embodiments, LIDAR device 100 may include only one light emitter 102. In other embodiments, LIDAR device 100 may include a plurality of light emitters 102. Each light emitter in the plurality of light emitters 102 may be configured to emit light that illuminates a respective field of view, for example, based on a location of the light emitter relative to optical element(s) 114. The respective fields of view of light emitters 102 could be either overlapping or non-overlapping.

Detector(s) 106 could include any type of light detector that is arranged to intercept and detect reflections of light emitted by light emitter(s) 102 that return to LIDAR device 100 from the environment. Example detector(s) 106 include photodiodes, avalanche photodiodes (APDs), silicon photomultipliers (SiPMs), single photon avalanche diodes (SPADs), multi-pixel photon counters (MPPCs), phototransistors, active pixel sensors (APS), charge coupled devices (CCD), cryogenic detectors, and/or any other detector that can detect light having the wavelengths emitted by light emitter(s) 102.

In example embodiments, detector(s) 106 are paired with light emitter(s) 102 to form a plurality of transmit/receive channels. In each transmit/receive channel, the light emitter is configured to emit light into a respective field of view and the detector that is paired with the light emitter is configured to receive and detect light from the same or similar field of view.

Emitter circuitry 108 includes circuitry that can selectively activate and deactivate individual light emitters in light emitter(s) 102 for particular measurement periods, for example, under the control of controller 128. To activate a selected light emitter for a particular measurement period, emitter circuitry 108 may include a capacitor (or other energy storage device) that is charged up and then discharged such that a current flows through the selected light emitter. The current flowing through the selected light emitter causes the selected light emitter to emit a light pulse during the particular measurement period. To deactivate a selected light emitter for a particular measurement period, emitter circuitry 108 could either not charge up the capacitor or could charge up the capacitor and then discharge the capacitor in such a way that little or no current flows through the selected light emitter (e.g., the capacitor could be discharged through a current path that does not flow through the selected light emitter). As a result, the selected light emitter does not emit a light pulse (or emits a light pulse that has a reduced intensity or pulse energy) during the particular measurement period.

The detector circuitry 112 is configured to output a respective signal based on light detected by each of detector(s) 106. For example, the detector circuitry 112 may include for each of detector(s) 106 a respective analog-to-digital converter (ADC) that is configured to sample the output of the detector at various times so as to output at each time a digital value that corresponds to the detected light signal (e.g., a current resulting from detected photons). The sampling rate of the ADC may be selected based on the pulse duration of the emitted light pulses so as to obtain multiple samples for each reflected pulse. For example, if the emitted light pulses have a pulse duration of 2 nanoseconds, the ADC may sample the output of a detector every 100 to 500 picoseconds. The digital values determined in this way may be used to determine the shape of a reflected light pulse detected by a detector as a function of time (e.g., including a rising edge, a peak, and a falling edge).

Optical element(s) 114 may include one or more lenses, mirrors, light guides, apertures, diffusers, and/or other optical elements that direct light emitted by light emitter(s) 102 into an environment of LIDAR device 100 and that direct reflected light from the environment to detector(s) 106. In example embodiments, optical element(s) 114 pair light emitter(s) 102 with detector(s) 106 to form one or more transmit/receive channels. In such embodiments, each transmit/receive channel is associated with a respective field of view, and optical element(s) 114 direct light from the light emitter of a channel into the channel's particular field of view and direct reflected light from within the channel's particular field of view to the corresponding detector of the channel.

In some embodiments, LIDAR device 100 is configured to rotate. As shown in FIG. 1, LIDAR device 100 includes rotating platform 118 that rotates relative to stationary platform 120 under the control of actuator(s) 122. Stationary platform 120 could be, for example, mounted on a vehicle. Light emitter(s) 102, detector(s) 106, emitter circuitry 108, detector circuitry 112, and optical element(s) 114 could be mounted on or coupled to rotating platform 118. Actuator(s) 122 may include one or more motors, pneumatic actuators, hydraulic pistons, and/or piezoelectric actuators, and/or any other types of actuators. Actuator(s) 122 may be operated (e.g., by controller 128) to cause rotating platform 118 to rotate about an axis of rotation. In some embodiments, the axis of rotation may be a vertical axis.

For example, LIDAR device 100 may be mounted on a vehicle, and the axis of rotation may be generally perpendicular to the road surface on which the vehicle is operating. In some embodiments, rotating platform 118 may rotate through a full 360 degrees at a rate of 3-30 Hz. Other rates of rotation are possible as well. In other embodiments, rotating platform 118 may rotate less than 360 degrees. For example, rotating platform 118 may swivel back and forth within a range of angles. In some embodiments, rotating platform 118 may continuously rotate LIDAR device 100 during a plurality of measurement periods. In other embodiments, rotating platform 118 might not provide continuous rotation but may instead be used to adjust the orientation of LIDAR device 100 at various times (e.g., in response to identifying certain regions of interest in the environment).

As shown in FIG. 1, LIDAR device 100 includes a housing 124 that encloses light emitter(s) 102, detector(s) 106, emitter circuitry 108, detector circuitry 112, and optical element(s) 114. Housing 124 may be coupled to rotating platform 118. In some embodiments, housing 124 may be transparent to the light emitted by light emitter(s) 102. In other embodiments, housing 124 may be opaque but may include an optical window 126 that is transparent to the light emitted by light emitter(s) 102. For example, optical element(s) 114 may be arranged so as to direct light emitted by light emitter(s) 102 through optical window 126 into the environment of LIDAR device 100 and may be arranged so as direct to detector(s) 106 reflected light from the environment that enters LIDAR device 100 through optical window 126.

Controller 128 may include one or more processors 130 and data storage 132. Processor(s) 130 may include one or more general-purpose processors and/or one or more special-purpose processors (e.g., digital signal processors, etc.). Data storage 132 may include or take the form of one or more non-transitory computer-readable storage media that may be read or accessed by processor(s) 130. Data storage 132 can include volatile and/or non-volatile storage components, such as electrical, optical, magnetic, organic or other memory or disc storage, which may be integrated in whole or in part with at least one of processor(s) 130. In addition to or instead of processor(s) 130 and data storage 132, controller 128 may include other types of analog and/or digital circuitry. For example, controller 128 may include a field-programmable gate array (FPGA) or an application-specific integrated circuit (ASIC).

In some examples, data storage 132 may store program instructions that are executable by processor(s) 130 to cause LIDAR device 100 to perform the various operations described herein. For example, controller 128 may control light emitter(s) 102 through emitter circuitry 108 (e.g., to activate and deactivate individual light emitters in light emitter(s) 102). Controller 128 may also receive data from detector circuitry 112 (e.g., ADC values with corresponding timestamps) and may analyze the data to detect reflected light pulses. Controller 128 may also control actuator(s) 122 so as to control the rotation of LIDAR device 100. Controller 128 may perform other operations as well. Further, in connection with certain operations, controller 128 may communicate with computing devices or other components outside of LIDAR device 100. For example, in implementations in which LIDAR device 100 is coupled to an autonomous vehicle, controller 128 may transmit data to and receive instructions from a computing device that controls the autonomous operation of the vehicle.

Figure 2:
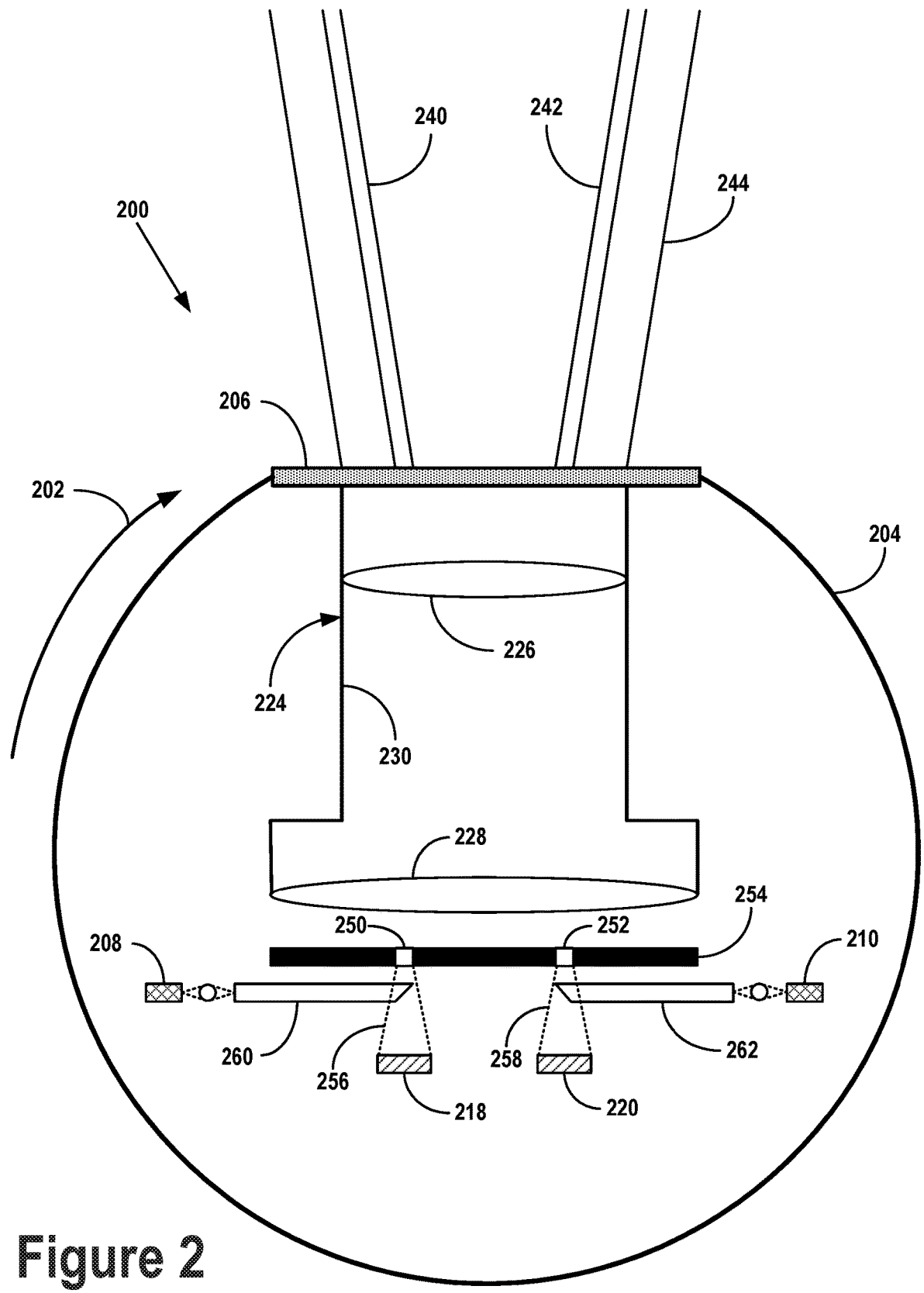
FIG. 2 illustrates a sectional view of a LIDAR device, in accordance with example embodiments.
Figure 3A:
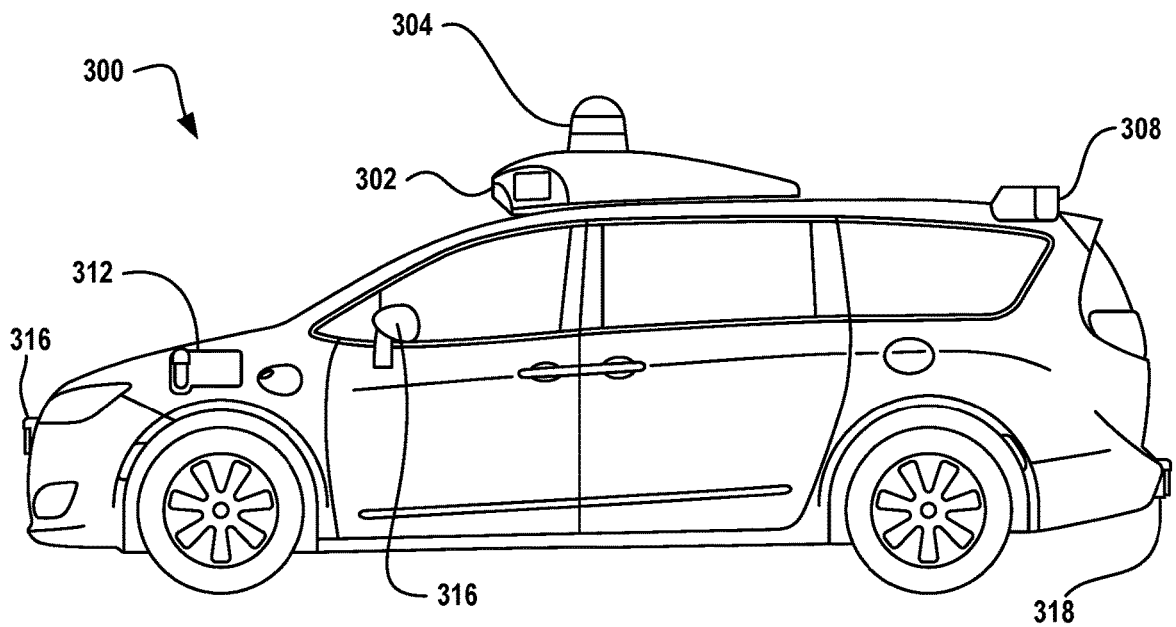
FIGS. 3A, 3B, 3C, 3D, and 3E illustrate a physical configuration of a vehicle, in accordance with example embodiments.
Figure 3B:
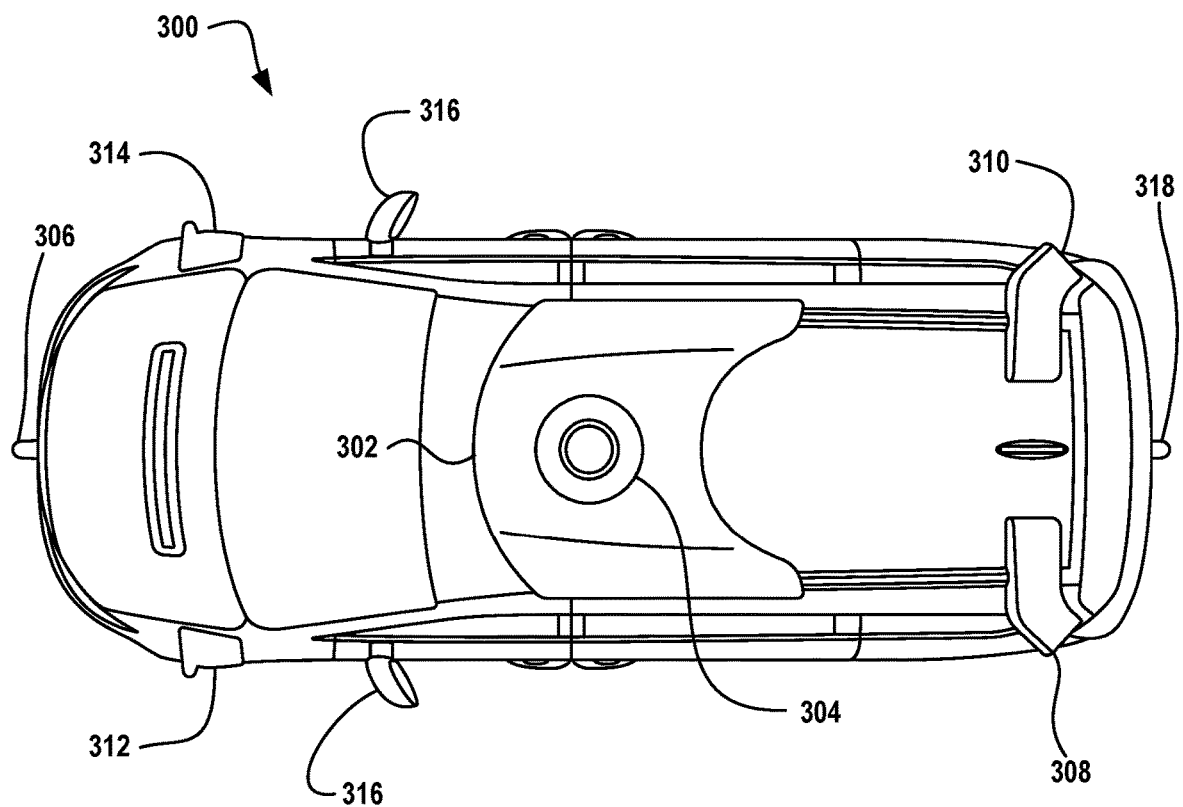
Figure 3C:
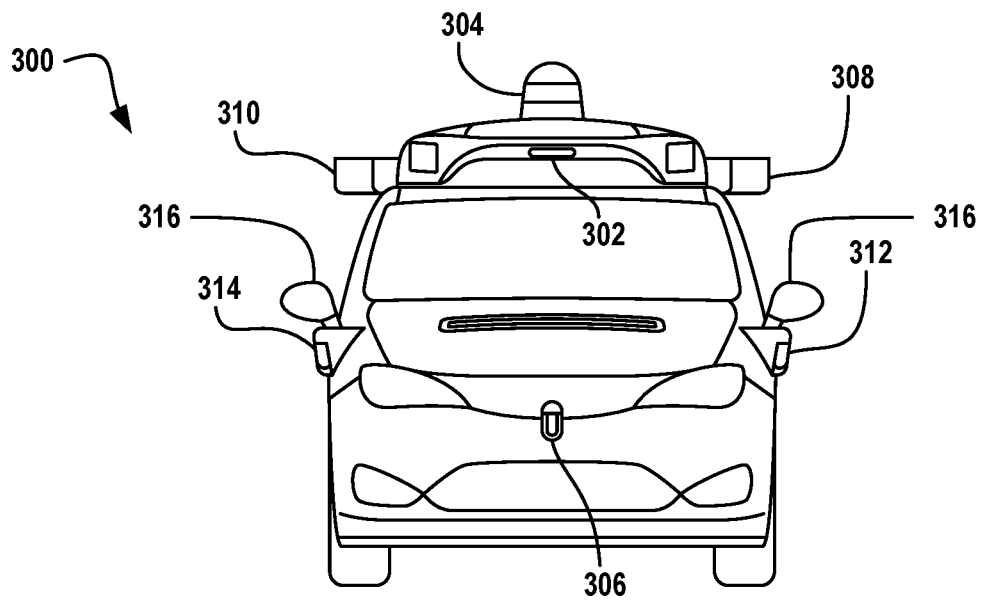
Figure 3D:
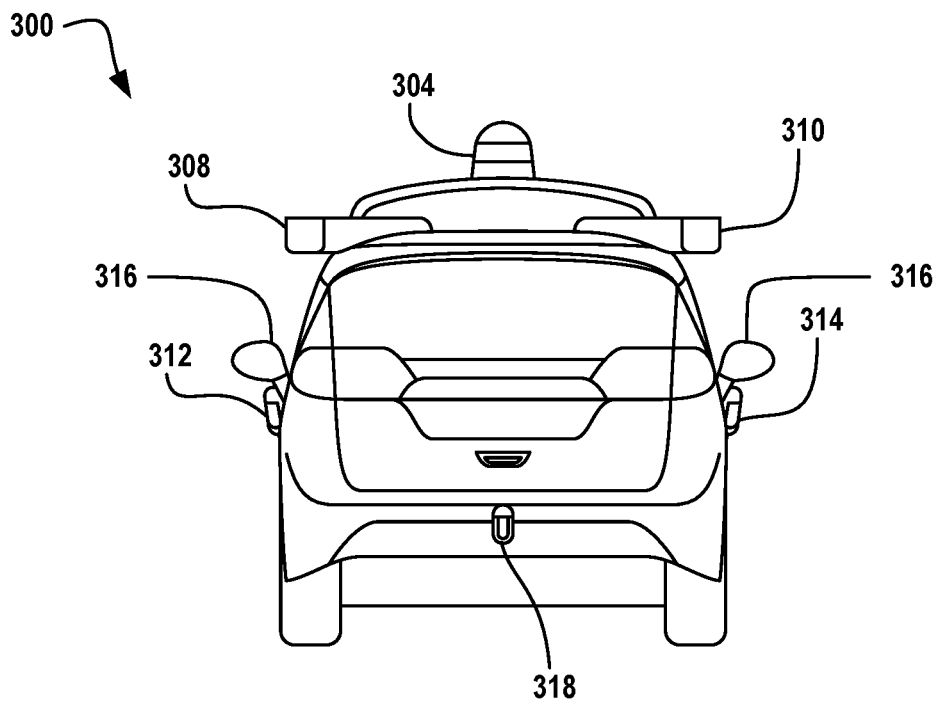
Figure 3E:
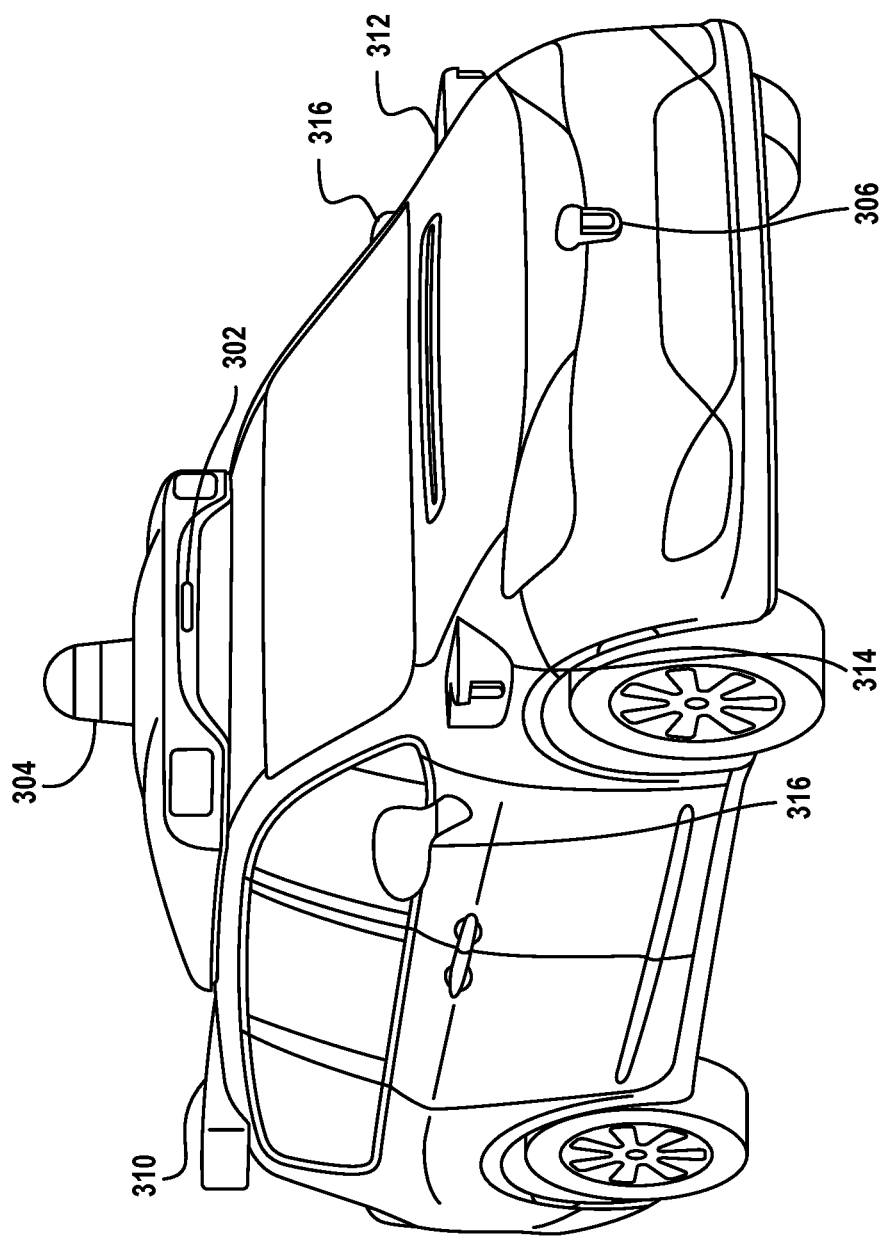

FIG. 2 is a sectional view of a LIDAR device 200, according to example embodiments. In this example, LIDAR device 200 is configured to rotate about an axis of rotation in a rotation direction 202. The sectional view of FIG. 2 is in a plane perpendicular to the axis of rotation. The axis of rotation could be a vertical axis, such that the rotation in the rotation direction 202 enables the LIDAR device 200 to scan a range of azimuthal angles in the environment. Alternatively or additionally, LIDAR device 200 could rotate about a horizontal axis to scan a range of elevational angles or could be configured to scan a portion of the environment in some other way.

As shown, LIDAR device 200 includes various optical components that are enclosed within a housing 204 and an optical window 206. The optical components of LIDAR device 200 include a plurality of light emitters, exemplified by light emitters 208 and 210, and a plurality of detectors, exemplified by detectors 218 and 220. In this example, light emitter 208 is paired with detector 218 to provide a first transmit/receive channel, and light emitter 210 is paired with detector 220 to provide a second transmit/receive channel. Although FIG. 2 shows two light emitters and two detectors, it is to be understood that LIDAR device 200 could include any number of light emitters and detectors to provide any number of transmit/receive channels.

In this example, LIDAR device 200 includes a telecentric lens assembly 224 that includes a plurality of lenses, exemplified by lenses 226 and 228, mounted in a lens barrel/baffle structure 230 that is coupled to optical window 206. The telecentric lens assembly 224 is arranged to direct light emitted from light emitters 208 and 210 through optical window 206 into the environment of the LIDAR device 200, so as to illuminate fields of view 240 and 242, respectively. The telecentric lens assembly 224 is further arranged to direct reflected light from the environment that enters the LIDAR device 200 through optical window 206 from within the fields of view 240 and 242 toward detectors 218 and 220, respectively.

The fields of view 240 and 242 are defined, in part, by apertures 250 and 252, respectively. The apertures 250 and 252 may be pinhole apertures (e.g., with diameters between 100 microns and 500 microns) formed in an opaque material, shown as aperture plate 254. For purposes of illustration, FIG. 2 shows only two apertures. However, it is to be understood that the aperture plate 254 may include any number of apertures, with each aperture defining a respective field of view for a respective transmit/receive channel that includes a respective light emitter and a respective detector. The apertures in the aperture plate 254 could be arranged in a one-dimensional array, a two-dimensional array, or in some other pattern. The various fields of view of the transmit/receive channels may together provide the LIDAR device 200 with an overall field of view 244.

The apertures 250 and 252 are positioned at a focal plane of the telecentric lens assembly 224 between the telecentric lens assembly 224 and detectors 218 and 220. With this configuration, light from the field of views 240 and 242 is focused within the apertures 250 and 252 by the telecentric lens assembly 224, and the focused light thereafter diverges toward detectors 218 and 220. As shown, detector 218 intercepts diverging light 256 from aperture 250 and detector 220 intercepts diverging light 258 from aperture 252. Advantageously, detectors 218 and 220 may each include an array of single photon detectors that covers an area that generally matches the area illuminated by the diverging light 256 and 258, so as to provide for single photon detection with a high dynamic range. For example, detectors 218 and 220 may each include a SiPM.

As shown, the light emitted by light emitters 208 and 210 is directed to the apertures 250 and 252 by light guides 260 and 262, respectively. More particularly, the light emitted by light emitters 208 and 210 is coupled into input ends of the light guides 260 and 262 (e.g., via respective cylindrical lenses), and the light guides 260 and 262 guide the light by total internal reflection from their respective input ends to respective output ends that are positioned proximate the apertures 250 and 252. The output ends of the light guides 260 and 262 include reflective angled surfaces that reflect at least a portion of the guided light out of the light guides 260 and 262 toward the apertures 250 and 252, respectively. The telecentric lens assembly 224 collimates the light emitted from the light guides 260 and 262 through the apertures 250 and 252 and transmits the collimated light through optical window 206 into the fields of view 240 and 242, respectively.

III. Example Vehicle System

FIGS. 3A-3E show an example vehicle 300. Vehicle 300 can use LIDAR device 100 and/or LIDAR device 200 described in FIGS. 1 and 2, respectively, among other types of sensors to navigate through an environment. Although vehicle 300 is illustrated in FIGS. 3A-3E as a van for illustrative purposes, the present disclosure is not so limited. For instance, vehicle 300 can represent a truck, a car, a semi-trailer truck, a motorcycle, a golf cart, an off-road vehicle, a farm vehicle, a robotic device, an aerial vehicle, etc.

Vehicle 300 includes sensor units 302, 304, 306, 308, 310, 312, 314, 316, and 318 (i.e., sensor units 302-318), each of which may include a respective combination of one or more of a RADAR device, a LIDAR device, a laser rangefinder device, a camera device (e.g., a visible light camera, a thermal camera, an NIR camera, and/or a short wave infrared (SWIR) camera), and/or other types of sensors. Sensor units 302-318 can actively scan the surrounding environment for the presence of potential obstacles.

For example, sensor unit 302 is mounted atop vehicle 300 and includes one or more sensors configured to detect information about an environment surrounding vehicle 300, and output indications of the information. Sensor unit 302 can include one or more movable mounts that could be operable to adjust the orientation of one or more sensors in sensor unit 302. In one embodiment, the movable mount could include a rotating platform that could scan sensors so as to obtain information from each direction around vehicle 300. In another embodiment, the movable mount of sensor unit 302 could be movable in a scanning fashion within a particular range of angles and/or azimuths. Sensor unit 302 could be mounted atop the roof of a car, although other mounting locations are possible.

Additionally, the sensors of sensor unit 302 could be distributed in different locations and need not be collocated in a single location. Furthermore, each sensor of sensor unit 302 can be configured to be moved or scanned independently of other sensors of sensor unit 302.

Sensor units 308, 310, and 318 can be located near the rear of vehicle 300, to actively scan the environment near the back of vehicle 300 for the presence of objects. Similarly, sensor units 312, 314, and 306 may be mounted near the front of vehicle 300 to actively scan the environment near the front of vehicle 300. These sensor units can be situated, for example, in a location suitable to scan/view a region including a forward-moving path of vehicle 300 without occlusion by other features of vehicle 300. For example, sensors can be embedded in and/or mounted in or near the front bumper, front headlights, cowl, and/or hood, etc. Furthermore, one or more additional sensors can be located to actively scan the side (e.g., sensor units 316) and/or rear of vehicle 300 for the presence of objects, such as by including such devices in or near the rear bumper, side panels, rocker panels, and/or undercarriage, etc.

Although not shown in FIGS. 3A-3E, vehicle 300 can include a wireless communication system. The wireless communication system may include wireless transmitters and receivers that could be configured to communicate with devices external or internal to vehicle 300. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Sensor units 302-318 can include one or more cameras. A camera can be a photosensitive instrument, such as a still camera, a video camera, etc., that is configured to capture a plurality of images of the environment of vehicle 300. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which vehicle 300 illuminates an object in the environment with a predetermined light pattern, such as a grid or checkerboard pattern and uses the camera to detect a reflection of the predetermined light pattern from environmental surroundings. Based on distortions in the reflected light pattern, vehicle 300 can determine the distance to the points on the object. In another example, the camera may be a stereoscopic camera that allows distance to be measured based on pixel disparity.

A control system of vehicle 300 may be configured to control vehicle 300 in accordance with a control strategy from among multiple possible control strategies. The control system may be configured to receive information from sensors coupled to vehicle 300 (on or off vehicle 300), modify the control strategy (and an associated driving behavior) based on the information, and control vehicle 300 in accordance with the modified control strategy. The control system further may be configured to monitor the information received from the sensors, and continuously evaluate driving conditions; and also may be configured to modify the control strategy and driving behavior based on changes in the driving conditions.

IV. Example NIR Illuminator and NIR Camera System

Figure 4:
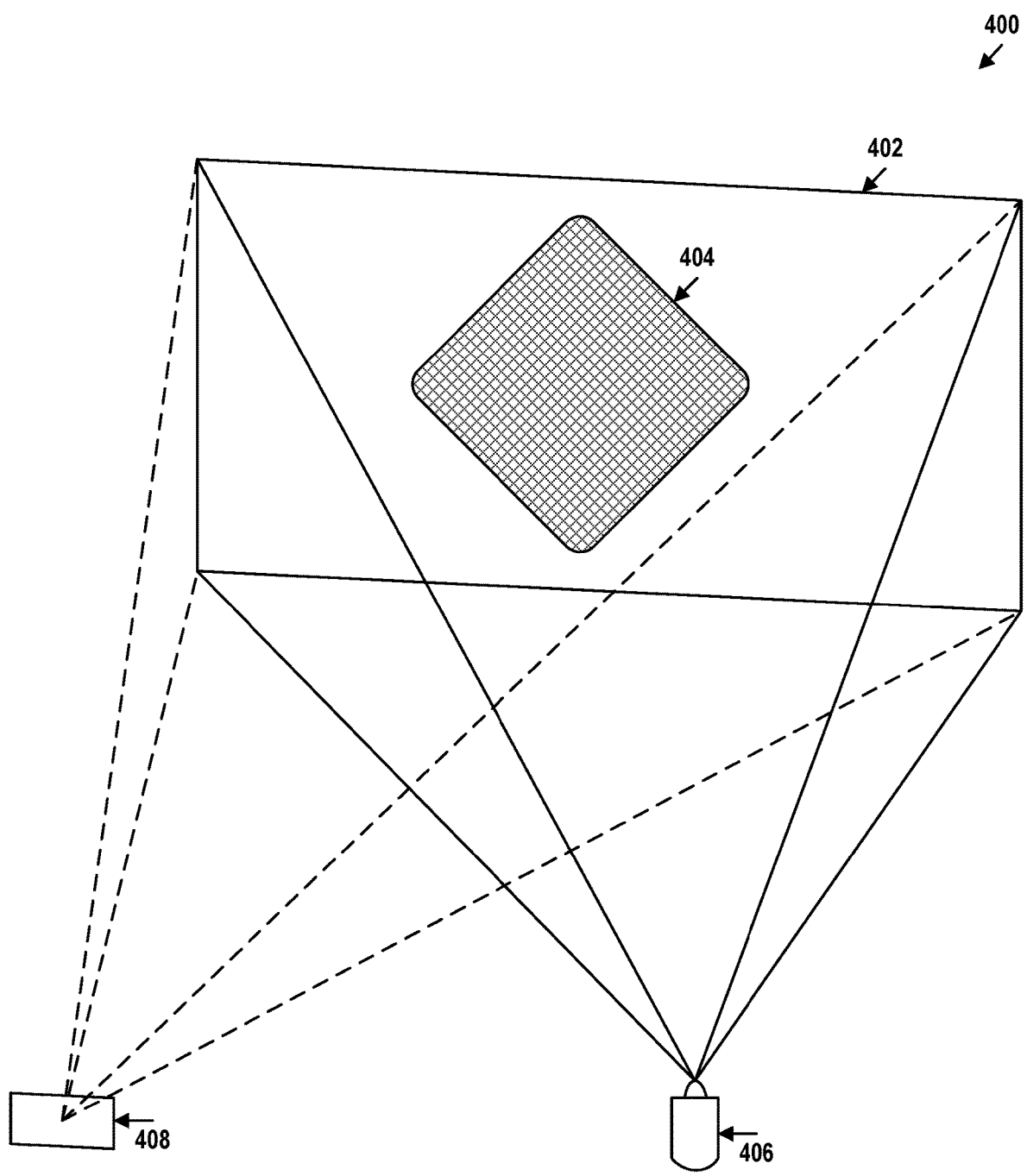
FIG. 4 illustrates an NIR illumination and imaging system, in accordance with example embodiments.

FIG. 4 illustrates a perspective view 400 of an example scenario in which an NIR imaging system, which includes an NIR illuminator and NIR image sensor, is used for imaging an environment. Specifically, NIR illuminator 406 may be used to illuminate a portion of environment 402 with NIR light. Some of that NIR light may be reflected off of objects in environment 402, and may be captured at NIR image sensor 408. For example, environment 402 may include therein retroreflector 404, which may reflect the NIR light emitted by NIR illuminator 406 back toward NIR illuminator 406 and NIR image sensor 408. Retroreflector 404 could be, for example, a road sign, a retroreflective marker on a vehicle, or some other type of retroreflector.

NIR illuminator 406 and NIR image sensor 408 may form part of one or more of sensor units 302-318 disposed on vehicle 300, as illustrated in FIGS. 3A-3E. NIR illuminator 406 and/or NIR image sensor 408 may be moveable or stationary. In some cases, each of sensor units 302-318 that includes a corresponding LIDAR device may also include a corresponding NIR illuminator and NIR image sensor. Due to being collocated, the LIDAR device, the NIR illuminator, and the NIR image sensor of a particular sensor unit may have similar fields of view, and may thus each be able to scan/image a particular portion of the environment. Thus, the NIR illuminator and the NIR image sensor may be used to detect retroreflectors within the particular portion of the environment, thereby allowing the corresponding LIDAR device to adjust its parameters in connection with scanning the detected retroreflectors.

Some retroreflectors may be configured to reflect light incident thereon back towards the light's source. Thus, in some implementations, NIR illuminator 406 and NIR image sensor 408 may be positioned in close proximity to one another and oriented in approximately the same direction, thereby increasing or maximizing the amount of NIR light incident on NIR image sensor 408 after reflection by a retroreflector. By matching the pose of NIR image sensor 408 to the pose of NIR illuminator 406, NIR image sensor 408 may be configured to capture image data representing the retroreflectors located within environment 402. Accordingly, in practice, NIR illuminator 406 and NIR image sensor 408 may be positioned closer to one another than shown in FIG. 4.

In some implementations, NIR illuminator 406 may be configured to emit, and NIR image sensor 408 may be configured to detect, NIR light having wavelengths between 700 nanometers and 2000 nanometers. In other implementations, the upper wavelength boundary of the NIR light may be higher, such as 2500 nanometers (rather than 2000 nanometers), for example.

In some cases, the wavelength range of the NIR light used by NIR illuminator 406 and NIR image sensor 408 may be selected to be near to and mutually exclusive of wavelengths of light used by a corresponding LIDAR device. For example, when the LIDAR device is configured to emit and detect infrared light having a wavelength of 905 nanometers, NIR illuminator 406 and NIR image sensor 408 may be configured to use NIR light having wavelengths above 1005 nanometers. Thus, at least a 100 nanometer threshold or buffer may separate the LIDAR wavelengths from wavelengths used by NIR illuminator 406 and NIR image sensor 408, thereby reducing or minimizing the probability of interference between these two imaging systems. In another example, when the LIDAR device emits and detects infrared light having a wavelength of 1550 nanometers, NIR illuminator 406 and NIR image sensor 408 may use NIR light having wavelengths below 1350 nanometers. Thus, in this example, at least a 200 nanometer threshold or buffer may separate the LIDAR wavelengths from wavelengths used by NIR illuminator 406 and NIR image sensor 408, thereby further reducing or minimizing the probability of interference between these two imaging systems.

Since the wavelengths used by NIR illuminator 406 and NIR image sensor 408 are adjacent to those used by the LIDAR device, the reflectivity observed by NIR image sensor 408 may be predictive of and/or representative of the reflectivity that the LIDAR device will observe. This allows parameters of the LIDAR device to be preemptively adjusted on the basis of NIR image data generated by NIR image sensor 408. Thus, in general, the separation between the wavelengths used by NIR illuminator 406 and NIR image sensor 408 and the wavelength used by the LIDAR device may be selected based on considerations of inter-sensor interference and the predictive/representative capacity of the reflective properties of objects.

In other cases, the wavelength range of the NIR light used by NIR illuminator 406 and NIR image sensor 408 may be selected to overlap with wavelengths of light used by a corresponding LIDAR device. For example, when the LIDAR device is configured to emit and detect infrared light having a wavelength of 905 nanometers, NIR illuminator 406 and NIR image sensor 408 may be configured to use NIR light that includes the 905 nanometer wavelength. In order to reduce and/or eliminate inter-sensor interference, operation of NIR illuminator 406 and NIR image sensor 408 may be synchronized with the LIDAR device such that, for example, NIR illuminator 406, NIR image sensor 408, and the LIDAR device emit and/or capture their respective NIR light during mutually exclusive time periods.

In some implementations, a system may include two or more instances of NIR image sensor 408. Thus, two or more NIR images, each representing a given portion of the environment from a different perspective, may be simultaneously captured, allowing for stereo-based depth sensing. Specifically, the two or more instances of image sensor 408 may be spaced apart by known distances, and depth may be determined via triangulation based on these known distances and representations of corresponding features between the two or more NIR images. Thus, such a system may be used to determine an angular position of a retroreflector relative to the vehicle, as well as an estimate of a distance between the vehicle and the retroreflector, allowing for more accurate adjustments of the LIDAR device parameters.

V. Example Retroreflector Detection Techniques

Figure 5A:
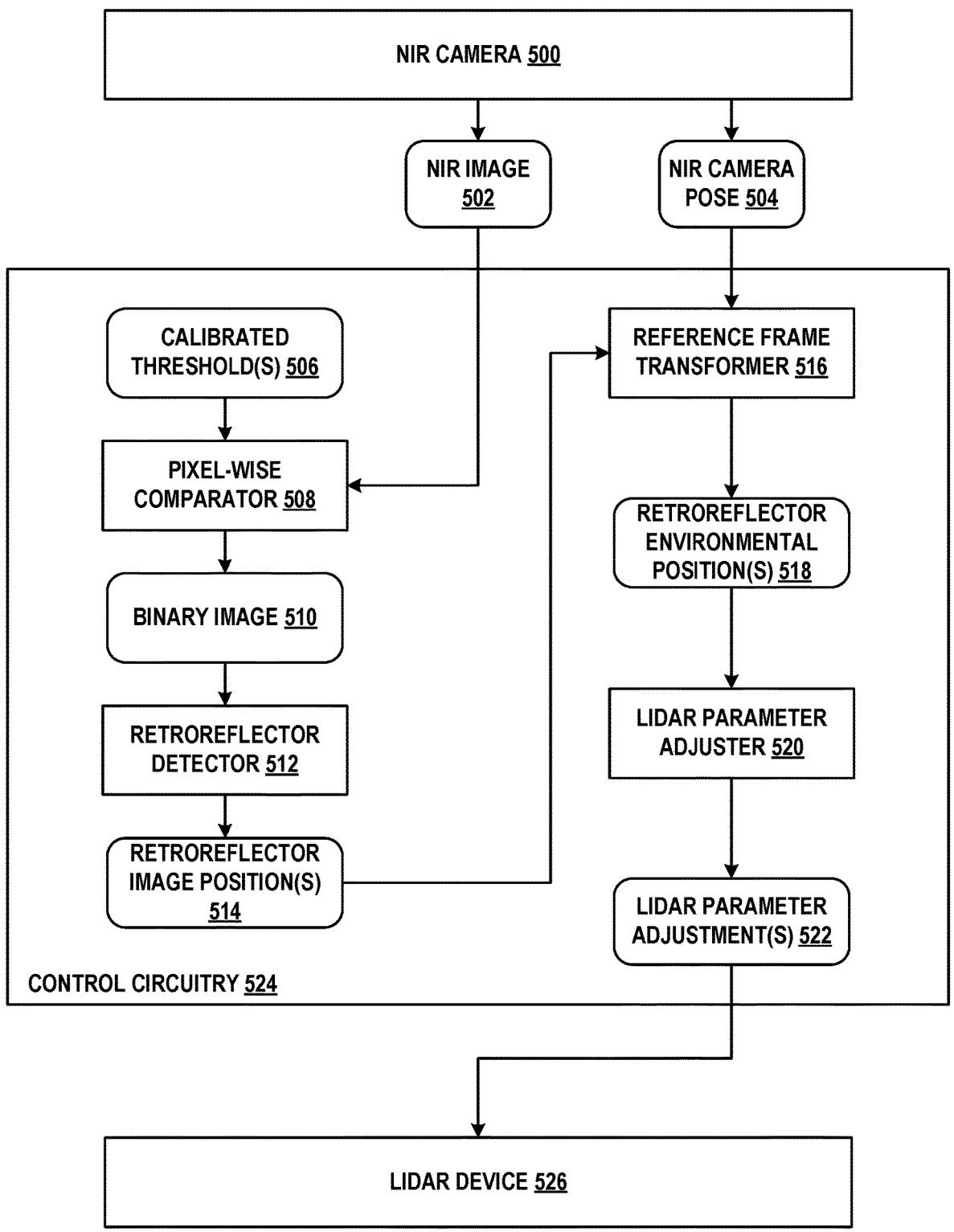
FIGS. 5A, 5B, and 5C illustrate systems for detecting retroreflectors, in accordance with example embodiments.

FIGS. 5A illustrates a first approach to detecting retroreflectors within NIR image data. Specifically, FIGS. 5A illustrates NIR camera 500, control circuitry 524, and LIDAR device 526. Although control circuitry 524 is shown as a stand-alone component, aspects of control circuitry 524 may, in some embodiments, form part of NIR camera 500, LIDAR device 526, and/or vehicle 300, among other possibilities. NIR camera 500, which may include NIR image sensor 408 of FIG. 4, may be configured to generate NIR image 502 that represents a portion of an environment illuminated by NIR light emitted by NIR illuminator 406.

The portion of the environment may contain therein a retroreflector. NIR camera 500, or other circuitry associated therewith, may also be configured to generate data indicative of NIR camera pose 504, which may represent the position and orientation of NIR camera 500 relative to the vehicle at the time of capture of NIR image 502.

Control circuitry 524 may be configured to detect retroreflectors within NIR image 502 on the basis of calibrated threshold(s) 506. Specifically, pixel-wise comparator 508 may be configured to compare the value of each pixel in NIR image 502 to calibrated threshold(s) 506 in order to generate binary image 510. Calibrated threshold(s) 506 may include empirically or computationally determined pixel intensity values that distinguish retroreflective objects from non-retroreflective objects within NIR images. That is, retroreflective objects may be associated with pixel values above calibrated threshold(s) 506, while non-retroreflective objects may be associated with pixel values below calibrated threshold(s) 506. In some cases, calibrated threshold(s) 506 may be context specific, and may thus vary based on factors such as weather and/or sensor position on the vehicle, among others. Accordingly, control circuitry 524 may be configured to select a particular threshold value from calibrated threshold(s) 506 based on contextual information associated with NIR image 502.

Each pixel in binary image 510 may be associated with either a high value (e.g., 1) or a low value (e.g., 0) based on whether the intensity values of the corresponding pixel in NIR image 502 was above or below, respectively, calibrated threshold(s) 506. Thus, one or more clusters of high values in binary image 510 may represent one or more retroreflectors. Accordingly, retroreflector detector 512 may be configured to process binary image 510 to identify therein retroreflector position(s) 514 of one or more retroreflectors. For example, retroreflector detector 512 may be configured to determine whether a cluster of one or more high-valued pixels in binary image 510 represents a retroreflector based on a shape of the cluster. Retroreflector position(s) 514 may represent, in pixel space, the coordinates of one or more groups of one or more pixels determined to represent one or more retroreflectors. For example, retroreflector position(s) 514 may represent, for each respective group of pixels determined to represent a corresponding retroreflector, the coordinates of the pixels that make up the respective group.

Retroreflector image position(s) 514 and NIR camera pose 504 may be provided as input to reference frame transformer 516, which may be configured to generate retroreflector environmental position(s) 518. Retroreflector environmental position(s) 518 may represent, for each respective retroreflector detected in NIR image 502, corresponding one or more positions associated with the respective retroreflector within a reference frame of LIDAR device 526. Thus, reference frame transformer 516 may be configured to transform pixel coordinates associated with NIR image 502 into LIDAR coordinates associated with LIDAR device 526, thereby allowing LIDAR device 526 to "know" where the detected retroreflectors are located.

To that end, reference frame transformer 516 may be configured to transform a set of one or more pixel coordinates associated with a respective retroreflector detected within NIR image 502, and represented by retroreflector image position(s) 514, into a set of one or more NIR camera coordinates that represent a position of the respective retroreflector within a reference frame of NIR camera 500. For example, each of the one or more pixel coordinates represented by a corresponding horizontal and vertical position in pixel space, may be transformed into a corresponding NIR camera coordinate represented by a corresponding azimuthal angle coordinate and an elevation angle coordinate in the reference frame of NIR camera 500.

Further, reference frame transformer 516 may be configured to transform the set of one or more NIR camera coordinates into a set of one or more LIDAR coordinates that represent the positon of the respective retroreflector within a reference frame of LIDAR device 526. For example, each of the NIR camera coordinates represented by the corresponding azimuthal angle coordinate and the elevation angle coordinate in the reference frame of NIR camera 500 may be transformed into a corresponding LIDAR coordinate represented by a corresponding azimuthal angle coordinate and an elevation angle coordinate in the reference frame of LIDAR device 526. In implementations where NIR camera 500 is configured to determine object depth and NIR image 502 thus includes depth information, the depth represented by NIR image 502 may be preserved by reference frame transformer 516 and may be represented in retroreflector environmental position(s) 518.

LIDAR parameter adjuster 520 may be configured to generate LIDAR parameter adjustment(s) 522 based on retroreflector environmental position(s) 518. LIDAR parameter adjustment(s) 522 may indicate, for the one or more positions associated with each respective detected retroreflector, as indicated by retroreflector environmental position(s) 518, one or more adjustments to one or more parameters of LIDAR device 526 in connection with scanning of the respective retroreflector. LIDAR parameter adjustment(s) 522 may be provided to LIDAR device 526 for execution. In some implementations, LIDAR parameter adjustment(s) 522 may express the one or more adjustments as target parameter values for corresponding parameters indicated with respect to time, space, and/or channels of LIDAR device 526.

In some cases, LIDAR parameter adjustment(s) 522 may omit scanning of the respective retroreflector. For example, scanning of the respective retroreflector may be omitted by deactivating and/or not using one or more emitters and/or one or more detectors of LIDAR device 526 at times when these emitters/detectors are expected to scan the respective retroreflector (i.e., when the fields of view of these emitters/detectors are expected to coincide with the respective retroreflector). In another example, scanning of the respective retroreflector may me omitted by temporarily increasing a speed with which LIDAR device 526 rotates, thus allowing one or more fields of view of LIDAR device 526 to move past the respective retroreflector in between scanning pulses.

In other cases, the adjustments may reduce a power with which emitters emit light towards the respective retroreflector and/or decrease a sensitivity with which detectors measure light reflected from the respective retroreflector. For example, light emitters associated with one or more channels may be caused to emit light with a lower intensity, since retroreflector 404 is expected to reflect a larger portion of the light back than a non-retroreflective surface. In another example, the sensitivity of light detectors associated with one or more channels may be reduced. Within examples, the extent of the adjustment may be based on the reflectivity of retroreflector 404 as measured based on NIR image 502. For example, the relative extent of the adjustment may increase as the reflectivity of retroreflector 404 increases, and may decrease as the reflectivity of retroreflector 404 decreases. Other adjustments are possible, including adjustments to parameters associated with one or more of light emitter(s) 102, detector(s) 106, emitter circuitry 108, detector circuitry 112, optical element(s) 114, optical window 126, rotating platform 118, actuator(s) 122, controller 128, and/or other components of LIDAR device 100.

Figure 5B:
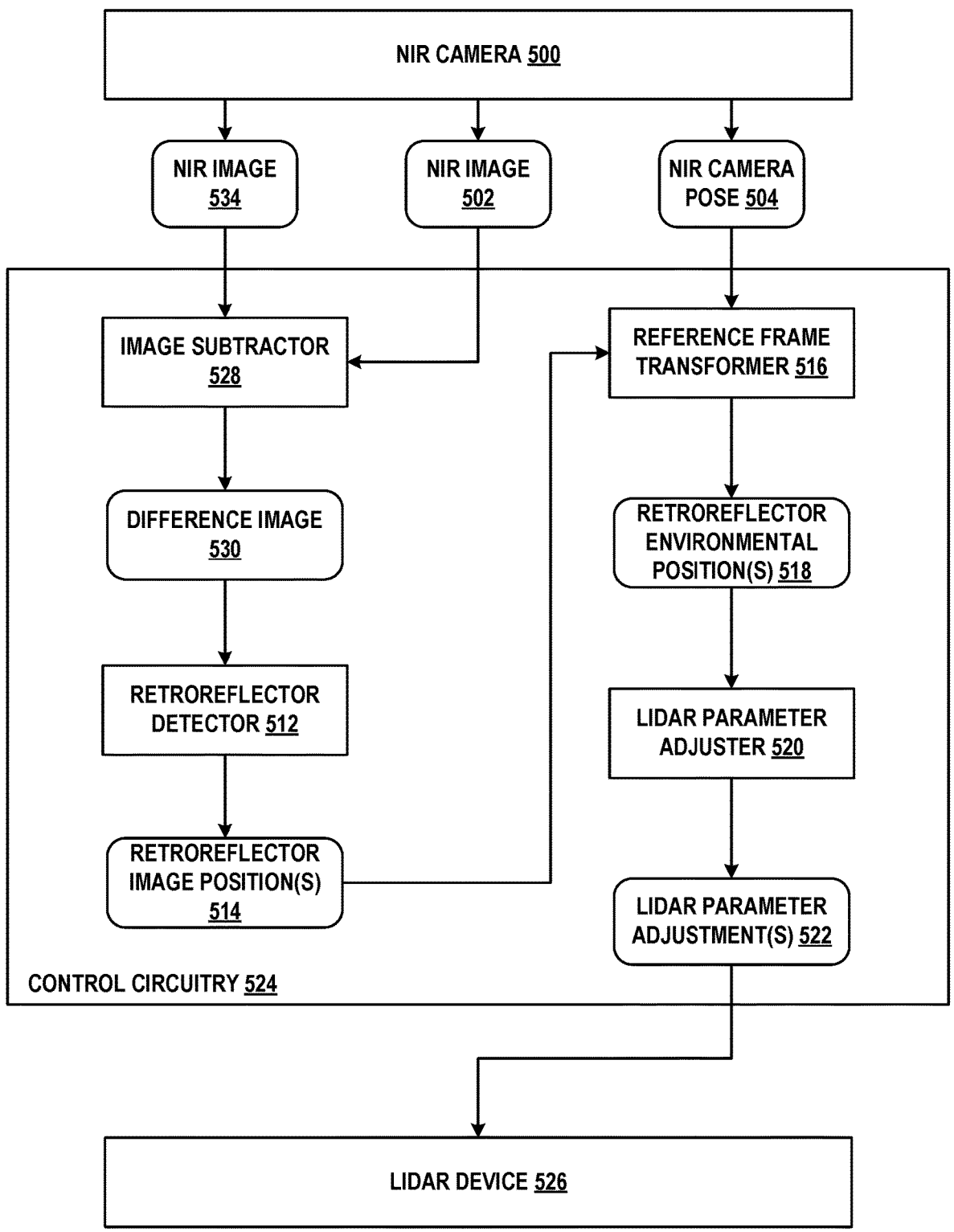

FIG. 5B illustrates a second approach to detecting retroreflectors within NIR image data. Specifically, NIR camera 500 may be configured to generate NIR image 502 that represents a portion of an environment illuminated by NIR light emitted by NIR illuminator 406, as well as NIR image 534 that represents the portion of the environment while it is not illuminated by the NIR light from NIR illuminator 406. Control circuitry 524 may be configured to detect retroreflectors within NIR image 502 based on a difference between (illuminated) NIR image 502 and (non-illuminated) NIR image 534.

Specifically, image subtractor 528 may be configured to subtract NIR image 534 from NIR image 502, thereby generating difference image 530. Image 502 may include clusters of high-intensity pixels representing retroreflectors as well as other sources of NIR light (e.g., NIR light from other NIR emitters within the environment, reflections of sunlight from surfaces within the environment, etc.). Thus, some high-intensity pixel clusters in NIR image 502 might not represent a retroreflector. NIR image 534 may include high-intensity pixel clusters representing the other sources of NIR light, but, since the NIR illuminator is not used when capturing NIR image 534, NIR image 534 likely does not represent any retroreflectors. Thus, by subtracting NIR image 534 from NIR image 502, any non-retroreflective objects will be filtered out, resulting in difference image 530 representing retroreflectors without also representing the other sources of NIR light.

Retroreflector detector 512 may be configured to receive difference image 530 as input and detect therein various retroreflectors. Retroreflector detector 512 may be configured to generate retroreflector image position(s) 514, as previously described, based on difference image 530 (which, like binary image 510, may represent therein retroreflectors via high-valued pixel clusters). Using difference image 530, rather than binary image 510, to detect retroreflectors may reduce the likelihood of false-positive retroreflector detections caused by, for example, non-retroreflective sources of NIR light being erroneously classified as retroreflectors.

As previously described, reference transformer 516 may be configured to generate retroreflector environmental position(s) 518 based on retroreflector image position(s) 514, and LIDAR parameter adjuster 520 may be configured to generate LIDAR parameter adjustment(s) 522 based on retroreflector environmental position(s) 518.

Figure 5C:
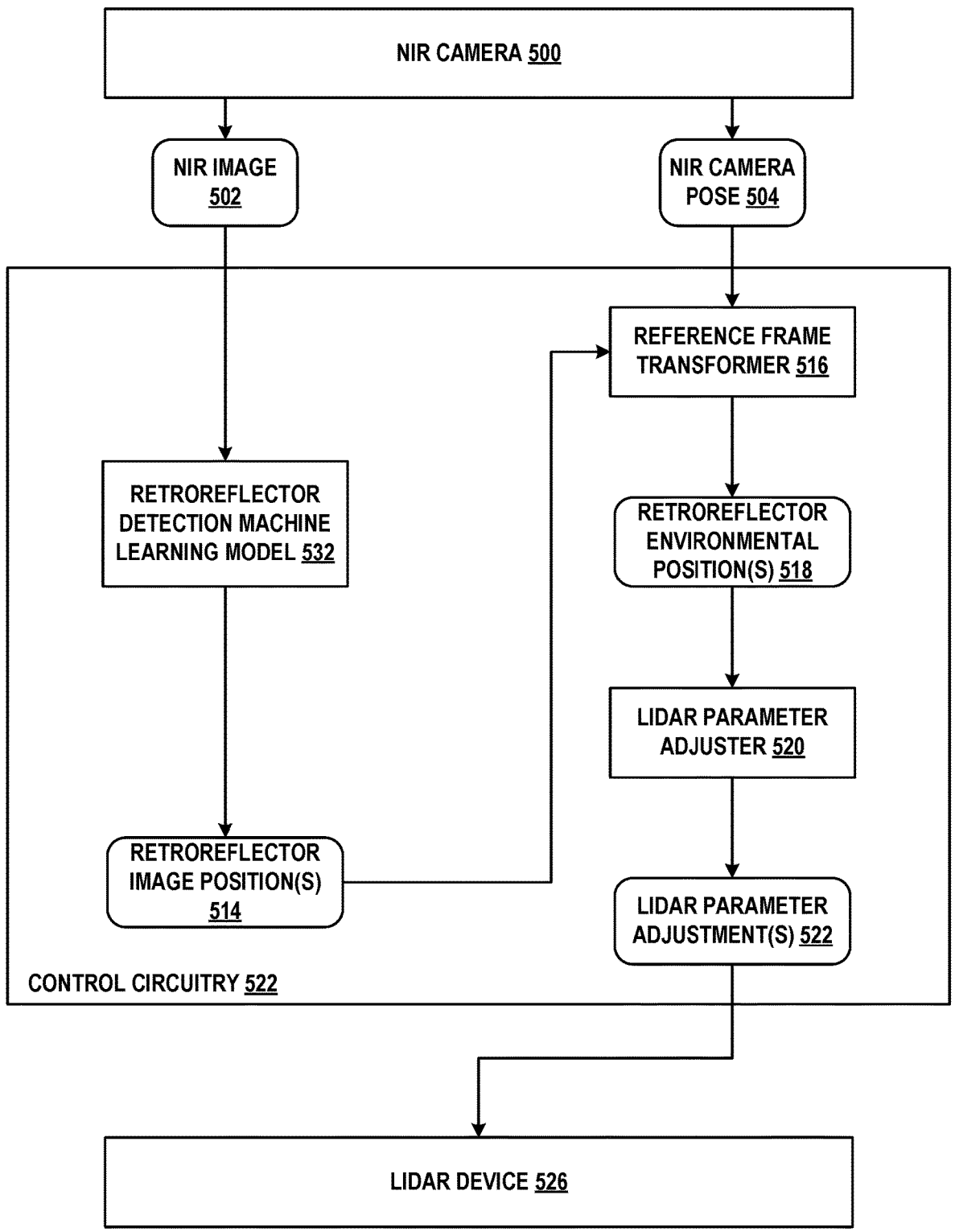

FIG. 5C illustrates a third approach to detecting retroreflectors within NIR image data. Specifically, NIR camera 500 may be configured to generate NIR image 502 that represents a portion of an environment illuminated by NIR light emitted by NIR illuminator 406. Control circuitry 524 may be configured to detect retroreflectors within NIR image 502 based on processing NIR image 502 by way of one or more machine learning models.

Specifically, retroreflector detection machine learning model 532 may be configured to receive NIR image 502 as input and, based thereon, generate retroreflector image position(s) 514. For example, retroreflector detection machine learning model 532 may include an artificial neural network trained to detect and/or segment (e.g., generate outlines of) instances of retroreflectors within NIR image 502. Retroreflector detection machine learning model 532 may be trained to detect and/or segment instances of retroreflectors by training on training data that includes a plurality of training NIR images, each of which may be annotated and/or labeled with indications of one or more retroreflectors represented thereby. In some cases, retroreflector detection machine learning model 532 may be able to distinguish between retroreflectors and other high-intensity pixel clusters by training on labeled NIR images that represent both retroreflectors (true positives) and non-retroreflective NIR light sources (false positives).

Further, as previously described, reference transformer 516 may be configured to generate retroreflector environmental position(s) 518 based on retroreflector image position(s) 514, and LIDAR parameter adjuster 520 may be configured to generate LIDAR parameter adjustment(s) 522 based on retroreflector environmental position(s) 518. Once LIDAR parameter adjustment(s) 522 are determined and provided to LIDAR device 526, LIDAR device 526 may be configured to modulate the parameters thereof according to adjustment(s) 522. Thus, the parameters of LIDAR device 526 may be spatially and temporally modulated as LIDAR device 526 sweeps over any detected retroreflectors.

VI. Example LIDAR Parameter Adjustments

Figure 6A:
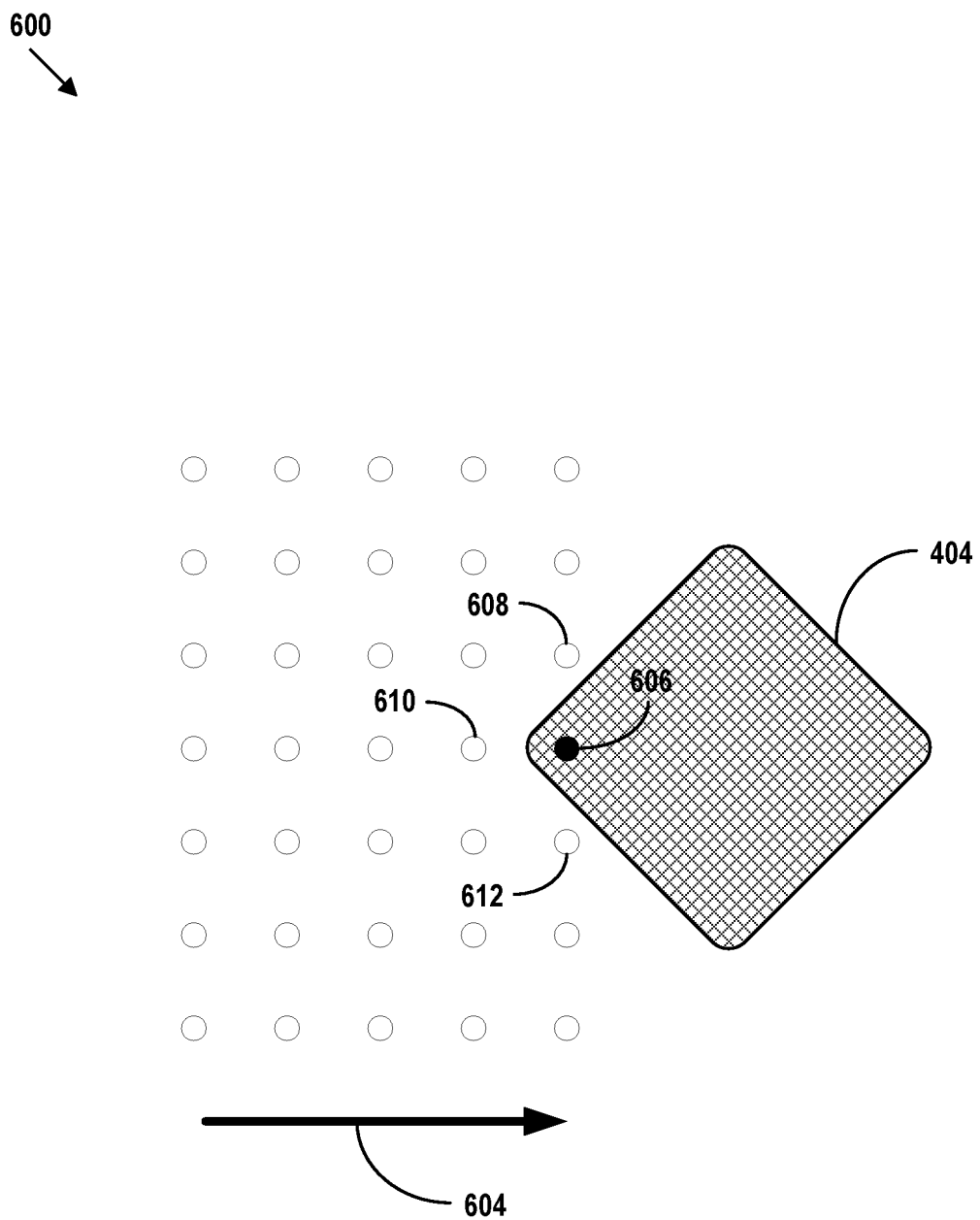
FIGS. 6A, 6B, and 6C illustrate a scenario in which parameters of a LIDAR device are adjusted as the LIDAR device scans portions of an environment, in accordance with example embodiments.
Figure 6B:
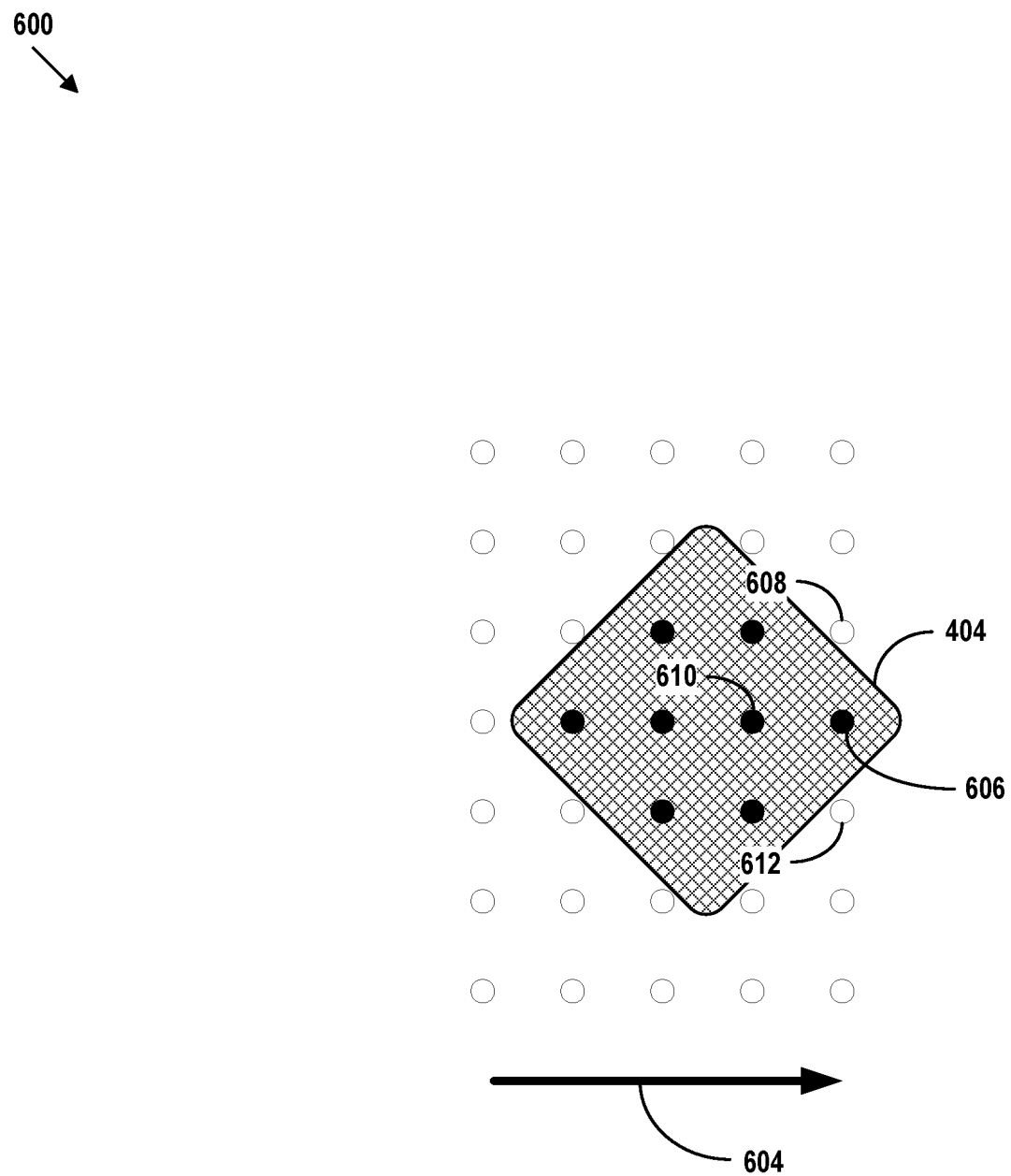
Figure 6C:
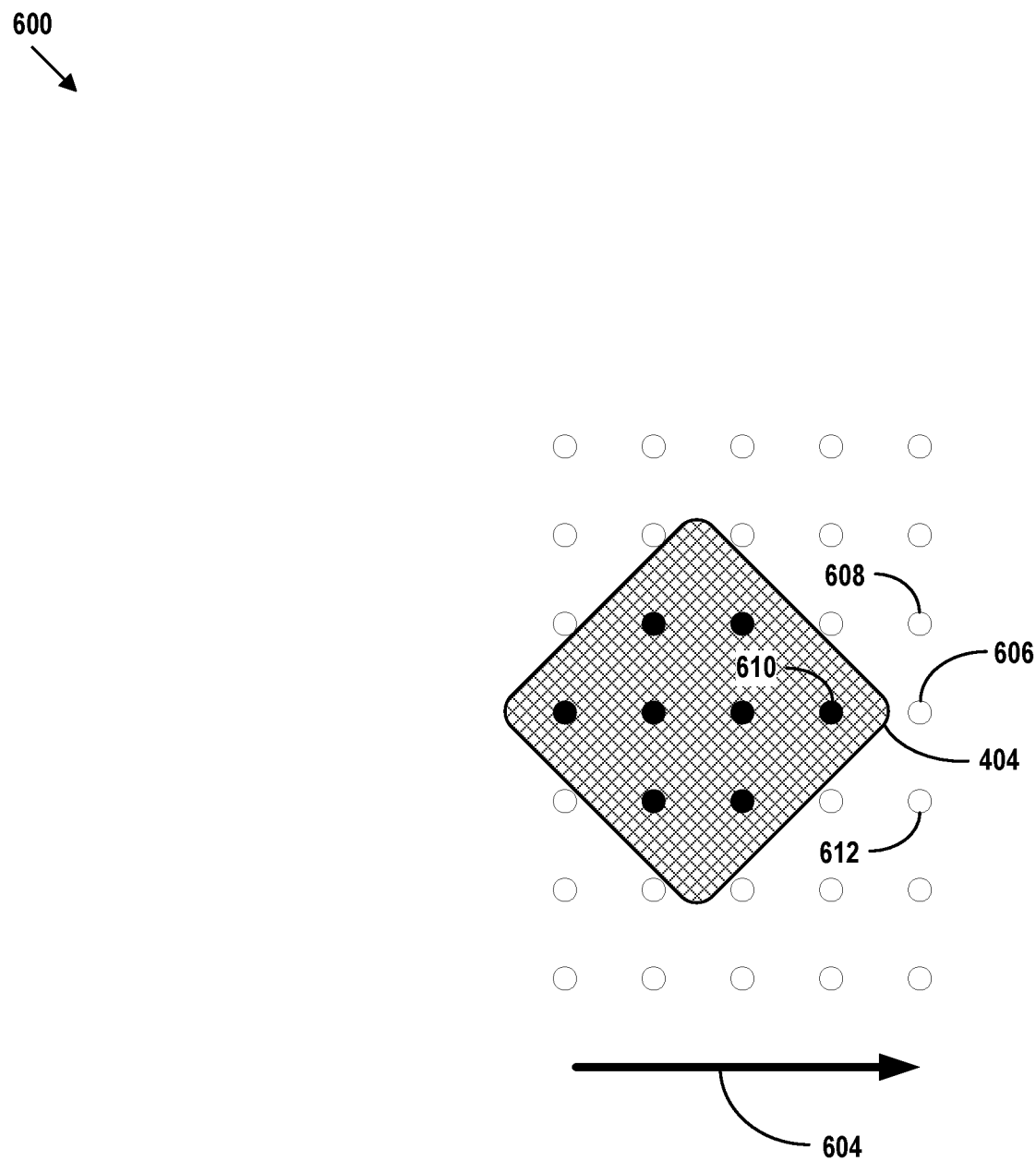

FIGS. 6A-6C illustrate an example scenario 600 in which one or more parameters of a LIDAR device (e.g., LIDAR device 524) are adjusted, based on the presence of a retroreflector, as the LIDAR device scans a portion of its environment. The LIDAR device may include a plurality of transmit/receive channels with fields of view that span a range of elevational angles and a range of azimuthal angles, as exemplified by field of view of channels 606, 608, 610, and 612. For purposes of illustration, FIGS. 6A-6C show the fields of view of the transmit/receive channels as a grid pattern that includes five different azimuthal angles and seven different elevational angles, resulting in thirty five different fields of view. The field of view of each individual transmit/receive channel is indicated by a circle. Within examples, however, the field of view a transmit/receive channel could take on some other shape. In addition, while FIGS. 6A-6C show the fields of view in a grid pattern, it is to be understood that the fields of view of the transmit/receive channels could be arranged differently.

In scenario 600, any of the aforementioned techniques may be used to detect retroreflector 404 within NIR image data, and to determine when to adjust one or more parameters of the LIDAR device to account for retroreflector 404 being present in one or more field of views of the LIDAR device. As shown in FIG. 6A, the grid pattern of the channels' fields of view is moving toward retroreflector 404 along direction 604, as may occur when the LIDAR device scans through a portion of its environment. Direction 604 may be a horizontal direction (e.g., parallel to the ground or road surface) based on, for example, the LIDAR device rotating about a vertical axis.

At the point in time illustrated in FIG. 6A, a portion of retroreflector 404 has just moved into the field of view of channel 606 but is not yet in the field of view of any other channels. If the light emitter of channel 606 were to emit a light pulse toward retroreflector 404, a strong reflected light pulse may be generated and detected by the detector of channel 606. The strong reflected light pulse may saturate the detector of channel 606. Additionally, one or more neighboring channels, such as channels 608, 610, and/or 612 might also detect a weak reflected light pulse that results from stray light from the strong reflected light pulse entering those channels' fields of view. Those weak reflected light pulses, if used for distance determinations, may result in inaccuracies.

Thus, it is desirable to detect the presence of the retroreflector 404 and to adjust operation of the LIDAR device accordingly to avoid illuminating retroreflector 404, to illuminate retroreflector 404 with a lower intensity light pulse, and/or decrease a sensitivity of one or more light detectors to the reflected light pulse, among other adjustments. Accordingly, as previously described, the position of retroreflector 404 within the reference frame of the LIDAR device may be determined. Thus, one or more parameters associated with channel 606 may be adjusted before the field of view thereof first coincides with retroreflector 404 (i.e., before the point in time illustrated in FIG. 6A). The one or more parameters associated with the field of view of channel 606 may remain as adjusted while the field of view of channel 606 continues to coincide with retroreflector 404, and may be adjusted back to the initial values after the field of view passes retroreflector 404. Accordingly, the field of view of channel 606 is black-filled to indicate that one or more parameters associated therewith have been adjusted.

In one example, adjustments to the one or more parameters may be initiated when the field of view of channel 606 comes within a threshold angular displacement of retroreflector 404. The threshold angular displacement may be selected to allow for inaccuracies in the determination of position of retroreflector 404 relative to the LIDAR device and/or to allow time for the adjustment to be completed. Thus, the threshold angular displacement may allow the adjustments to parameters of the field of view of channel 606 to be completed upon the field of view coinciding with retroreflector 404. The threshold angular displacement may be defined by and/or adjustable by LIDAR parameter adjuster 520.

FIG. 6B illustrates a later point in time when retroreflector 404 is in the field of view of channel 606, and is also in the fields of view of seven other channels, including channel 610. Thus, the fields of view of channels associated with parameter adjustments are black-filled, including the field of view of channel 610, which is shown coinciding with retroreflector 404. Parameters associated with the fields of view of channels 608 and 612 may have been adjusted at time points between those shown in FIGS. 6A and 6B, and may have been adjusted back to their initial values at the time point shown in FIG. 6B due to the fields of view of channels 608 and 612 no longer coinciding with retroreflector 404.

FIG. 6C illustrates a still later point in time when retroreflector 404 is no longer in the field of view of channel 606, and remains in the field of view of channel 610, among others. The fields of view of channels associated with parameter adjustments are black-filled, including the field of view of channel 610, which is shown coinciding with retroreflector 404. The fields of view of channels associated with parameters that have not been adjusted and/or that have been adjusted back to their initial values (e.g., the fields of view of channels 606) are white-filled.

VII. Additional Example Operations

Figure 7:
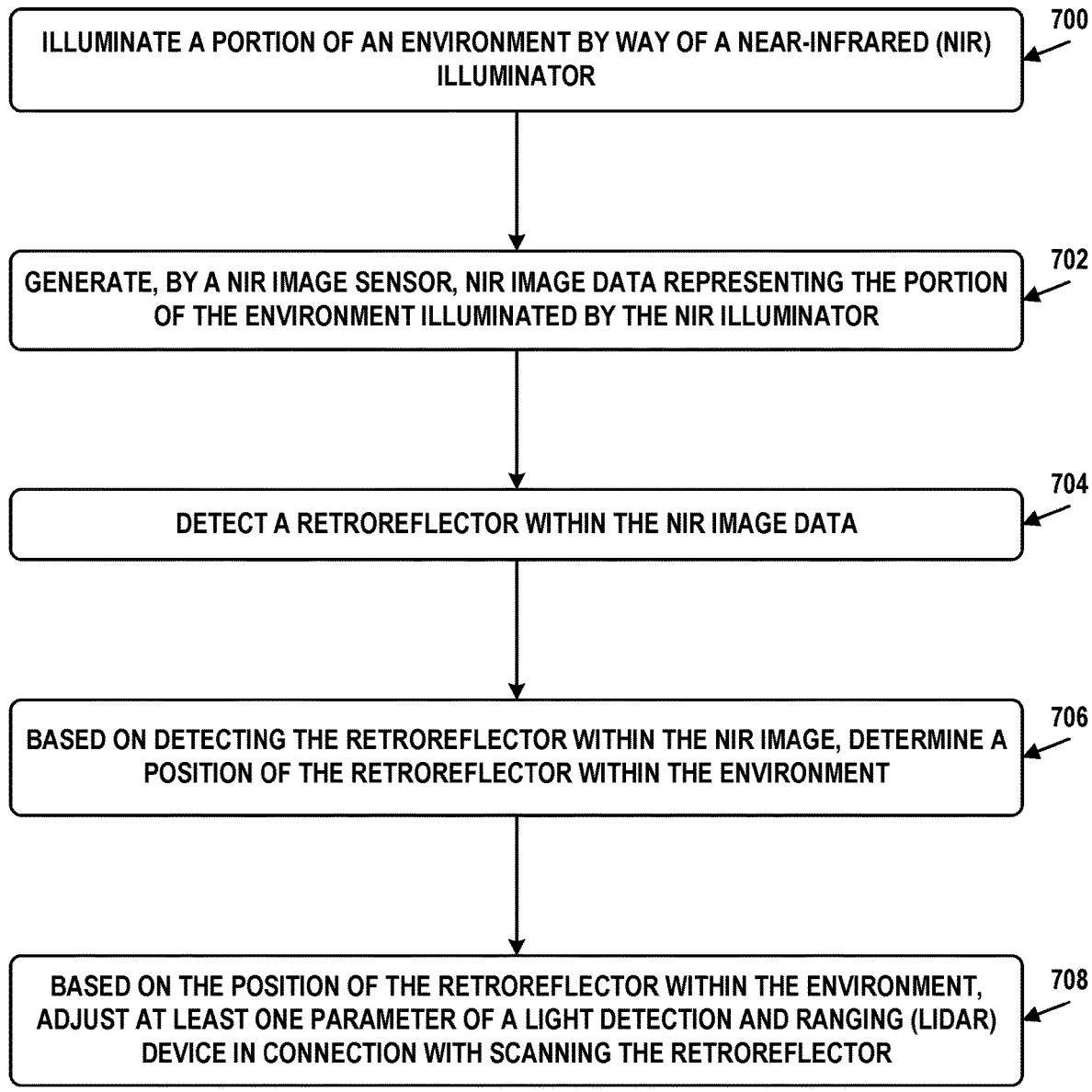
FIG. 7 illustrates a flow chart, in accordance with example embodiments.

FIG. 7 illustrates a flow chart of operations related to detecting a retroreflector and adjusting operation of at least one sensor in response to detection of the retroreflector. The operations may be carried out by one or more of LIDAR device 100, LIDAR device 200, vehicle 300, control circuitry 524, and/or other computing systems, devices, and/or circuitry, among other possibilities. The embodiments of FIG. 7 may be simplified by the removal of any one or more of the features shown therein. Further, these embodiments may be combined with features, aspects, and/or implementations of any of the previous figures or otherwise described herein.

Block 700 may involve illuminating a portion of an environment by way of an NIR illuminator.

Block 702 may involve generating, by a NIR image sensor, NIR image data representing the portion of the environment illuminated by the NIR illuminator.

Block 704 may involve detecting a retroreflector within the NIR image data.

Block 706 may involve, based on detecting the retroreflector within the NIR image, determining a position of the retroreflector within the environment.

Block 708 may involve, based on the position of the retroreflector within the environment, adjusting at least one parameter of a LIDAR device in connection with scanning the retroreflector.

In some embodiments, detecting the retroreflector within the NIR image data may include identifying one or more pixels within the NIR image data that have an intensity exceeding a threshold intensity value. The threshold intensity value may be calibrated such that intensities above the threshold intensity value are associated with NIR light retroreflection.

In some embodiments, additional NIR image data representing the portion of the environment without illumination by the NIR illuminator may be obtained. The additional NIR image data may be subtracted from the NIR image data to obtain a difference image. The retroreflector may be detected within the NIR image data based on the difference image.

In some embodiments, detecting the retroreflector within the NIR image data may include processing the NIR image data by way of one or more neural networks.

In some embodiments, adjusting the at least one parameter of the LIDAR device in connection with scanning the retroreflector may include omitting scanning of the retroreflector.

In some embodiments, adjusting the at least one parameter of the LIDAR device in connection with scanning the retroreflector may include reducing an intensity of light emitted by the LIDAR device when scanning the retroreflector.

In some embodiments, adjusting the at least one parameter of the LIDAR device in connection with scanning the retroreflector may include reducing a sensitivity of one or more detectors of the LIDAR device when scanning the retroreflector.

In some embodiments, the NIR illuminator may be configured to emit light within a first frequency band. The LIDAR device may be configured to emit light within a second frequency band. The first frequency band may be mutually exclusive of the second frequency band. The first frequency band may be separated from the second frequency band by less than a threshold frequency range.

In some embodiments, an autonomous vehicle may be configured to navigate through the environment based on data from the LIDAR device. The NIR illuminator, the NIR image sensor, and the LIDAR device may each be disposed on the autonomous vehicle.

In some embodiments, a field of view of the NIR image sensor may overlap with a field of view of the LIDAR device.

In some embodiments, the NIR illuminator may be configured to generate NIR light having a wavelength between 700 nanometers and 2000 nanometers. The NIR image sensor may be configured to sense at least the NIR light.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   a near-infrared (NIR) illuminator configured to emit light within a first frequency band;
   an NIR image sensor configured to detect light within the first frequency band;
   a light detection and ranging (LIDAR) device configured to emit light within a second frequency band, wherein the first frequency band is mutually exclusive of the second frequency band such that interference between (i) the NIR illuminator and the NIR image sensor and (ii) the LIDAR device is reduced, and wherein the first frequency band is separated from the second frequency band by less than a threshold frequency range such that reflectivity observed by the NIR image sensor is representative of reflectivity that the LIDAR device will observe; and
   control circuitry configured to perform operations comprising:
      causing the NIR illuminator to illuminate a portion of an environment;
      obtaining, from the NIR image sensor, NIR image data representing the portion of the environment illuminated by the NIR illuminator;
      detecting a retroreflector within the NIR image data;
      based on detecting the retroreflector within the NIR image, determining a position of the retroreflector within the environment; and
      based on the position of the retroreflector within the environment, adjusting at least one parameter of the LIDAR device in connection with scanning the retroreflector.

2. The system of claim 1, wherein detecting the retroreflector within the NIR image data comprises:
   identifying one or more pixels within the NIR image data that have an intensity exceeding a threshold intensity value.

3. The system of claim 1, wherein the operations further comprise:
   obtaining additional NIR image data representing the portion of the environment without illumination by the NIR illuminator; and subtracting the additional NIR image data from the NIR image data to obtain a difference image, wherein the retroreflector is detected within the NIR image data based on the difference image.

4. The system of claim 1, wherein detecting the retroreflector within the NIR image data comprises processing the NIR image data by one or more neural networks.

5. The system of claim 1, wherein adjusting the at least one parameter of the LIDAR device in connection with scanning the retroreflector comprises omitting scanning of the retroreflector.

6. The system of claim 1, wherein adjusting the at least one parameter of the LIDAR device in connection with scanning the retroreflector comprises reducing an intensity of light emitted by the LIDAR device when scanning the retroreflector.

7. The system of claim 1, wherein adjusting the at least one parameter of the LIDAR device in connection with scanning the retroreflector comprises reducing a sensitivity of one or more detectors of the LIDAR device when scanning the retroreflector.

8. The system of claim 1, further comprising:
an autonomous vehicle configured to navigate through the environment based on data from the LIDAR device, wherein the NIR illuminator, the NIR image sensor, and the LIDAR device are each disposed on the autonomous vehicle.

9. The system of claim 1, wherein a field of view of the NIR image sensor overlaps with a field of view of the LIDAR device.

10. The system of claim 1, wherein the NIR illuminator is configured to generate NIR light having a wavelength between 700 nanometers and 2000 nanometers, and wherein the NIR image sensor is configured to sense at least the NIR light.

11. A method comprising:
illuminating a portion of an environment by way of a near-infrared (NIR) illuminator configured to emit light within a first frequency band;
generating, by a NIR image sensor configured to detect light within the first frequency band, NIR image data representing the portion of the environment illuminated by the NIR illuminator;
detecting a retroreflector within the NIR image data;
based on detecting the retroreflector within the NIR image, determining a position of the retroreflector within the environment; and
based on the position of the retroreflector within the environment, adjusting at least one parameter of a light detection and ranging (LIDAR) device in connection with scanning the retroreflector, wherein the LIDAR device is configured to emit light within a second frequency band, wherein the first frequency band is mutually exclusive of the second frequency band such that interference between (i) the NIR illuminator and the NIR image sensor and (ii) the LIDAR device is reduced, and wherein the first frequency band is separated from the second frequency band by less than a threshold frequency range such that reflectivity observed by the NIR image sensor is representative of reflectivity that the LIDAR device will observe.

12. The method of claim 11, wherein detecting the retroreflector within the NIR image data comprises:
identifying one or more pixels within the NIR image data that have an intensity exceeding a threshold intensity value, wherein the threshold intensity value is calibrated such that intensities above the threshold intensity value are associated with NIR light retroreflection.

13. The method of claim 11, further comprising:
generating additional NIR image data representing the portion of the environment without illumination by the NIR illuminator; and
subtracting the additional NIR image data from the NIR image data to obtain a difference image, wherein the retroreflector is detected within the NIR image data based on the difference image.

14. The method of claim 11, wherein detecting the retroreflector within the NIR image data comprises processing the NIR image data by one or more neural networks.

15. The method of claim 11, wherein adjusting the at least one parameter of the LIDAR device in connection with scanning the retroreflector comprises omitting scanning of the retroreflector.

16. A non-transitory computer-readable storage medium having stored thereon instructions that, when executed by a computing system, cause the computing system to perform operations comprising:
causing a near-infrared (NIR) illuminator to illuminate a portion of an environment, wherein the NIR illuminator is configured to emit light within a first frequency band;
obtaining, from a NIR image sensor configured to detect light within the first frequency band, NIR image data representing the portion of the environment illuminated by the NIR illuminator;
detecting a retroreflector within the NIR image data;
based on detecting the retroreflector within the NIR image, determining a position of the retroreflector within the environment; and
based on the position of the retroreflector within the environment, adjusting at least one parameter of a light detection and ranging (LIDAR) device in connection with scanning the retroreflector, wherein the LIDAR device is configured to emit light within a second frequency band, wherein the first frequency band is mutually exclusive of the second frequency band such that interference between (i) the NIR illuminator and the NIR image sensor and (ii) the LIDAR device is reduced, and wherein the first frequency band is separated from the second frequency band by less than a threshold frequency range such that reflectivity observed by the NIR image sensor is representative of reflectivity that the LIDAR device will observe.

17. The system of claim 2, further comprising:
determining the threshold intensity value based on a context associated with obtaining the NIR image data, wherein the threshold intensity value is calibrated to the context such that intensities above the threshold intensity value are associated with NIR light retroreflection.

18. The system of claim 17, wherein the context associated with obtaining the NIR image data comprises one or more of: (i) weather conditions under which the NIR image data was captured, (ii) a time of day at which the NIR image data was captured, (iii) a power of the NIR illuminator used in connection with illuminating the portion of the environment, or (iv) a position of the NIR image sensor on a vehicle.

19. The system of claim 1, wherein:
the system further comprises a second NIR image sensor configured to detect light within the first frequency band,
obtaining the NIR image data comprises obtaining, from the second NIR image sensor, second NIR image data representing the portion of the environment illuminated by the NIR illuminator, the second NIR image data represents the environment from a different perspective than the NIR image data,
detecting the retroreflector within the NIR image data comprises detecting the retroreflector within the second NIR image data,
determining the position of the retroreflector within the environment comprises determining, based on detecting the retroreflector within the NIR image and detecting the retroreflector within the second NIR image data, a depth value associated with the retroreflector, and
the at least one parameter of the LIDAR device is adjusted based on the depth value.

20. The system of claim 1, wherein adjusting the at least one parameter of the LIDAR device in connection with scanning the retroreflector comprises increasing a rotational speed of the LIDAR device to increase a rate at which one or more field of view of the LIDAR device move past the retroreflector.

* * * * *